United States Patent
Petranovich et al.

(10) Patent No.: US 10,812,179 B2
(45) Date of Patent: *Oct. 20, 2020

(54) METHODS AND SYSTEMS FOR PERFORMING ANTENNA POINTING WHILE MITIGATING INTERFERENCE WITH A NEARBY SATELLITE

(71) Applicant: Viasat, Inc., Carlsbad, CA (US)

(72) Inventors: James E. Petranovich, La Jolla, CA (US); Bradley H. Smith, Cumming, GA (US); Eric L. Cross, Alpharetta, GA (US); Douglas J. Merrell, Buford, GA (US); Samuel C. Finney, Atlanta, GA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,369

(22) Filed: Apr. 12, 2019

(65) Prior Publication Data

US 2019/0349074 A1 Nov. 14, 2019

Related U.S. Application Data

(63) Continuation of application No. 15/269,355, filed on Sep. 19, 2016, now Pat. No. 10,305,581.

(51) Int. Cl.
*H01Q 3/02* (2006.01)
*H04B 7/185* (2006.01)
(Continued)

(52) U.S. Cl.
CPC ..... *H04B 7/18519* (2013.01); *H04B 7/18508* (2013.01); *H04B 7/18515* (2013.01);
(Continued)

(58) Field of Classification Search
CPC .. H04B 7/18519; H04B 7/18515; H04B 7/19; H04B 7/18508; H01Q 3/08; H01Q 3/005; H01Q 3/02
See application file for complete search history.

(56) References Cited

U.S. PATENT DOCUMENTS

| 5,043,737 A | * | 8/1991 | Dell-Imagine | ............ | G01S 3/42 |
|             |   |        |              |              | 342/352 |
| 6,377,561 B1 | * | 4/2002 | Black | ................ | H04B 7/18584 |
|             |   |        |              |              | 370/330 |

(Continued)

FOREIGN PATENT DOCUMENTS

IN 02885CH2009 A 8/2010

OTHER PUBLICATIONS

Federal Communications Commission, DA 07-4674, Order and Authorization:, Adopted Nov. 19, 2007, released Nov. 20, 2007, https://apps.fcc.gov/edocs_public/attachmatch/DA-07-4674A1.pdf. 11 pgs.

(Continued)

*Primary Examiner* — Dong-Chang Shiue
(74) *Attorney, Agent, or Firm* — Holland & Hart LLP

(57) ABSTRACT

Systems and methods are described herein for performing mispointing correction operations that can provide accurate pointing of an antenna towards a satellite, while also satisfying interference requirements with other satellites. As a result, the mispointing correction operations described herein can improve resource efficiency of communication systems using such antennas and help ensure compliance with interference requirements of other satellites.

24 Claims, 12 Drawing Sheets

(51) Int. Cl.
*H04B 7/19* (2006.01)
*H01Q 3/00* (2006.01)
*H01Q 3/08* (2006.01)

(52) U.S. Cl.
CPC .............. *H04B 7/19* (2013.01); *H01Q 3/005* (2013.01); *H01Q 3/02* (2013.01); *H01Q 3/08* (2013.01)

(56) References Cited

U.S. PATENT DOCUMENTS

| | | |
|---|---|---|
| 6,476,764 B2 | 11/2002 | Fang |
| 6,708,019 B2 | 3/2004 | McLain et al. |
| 6,731,240 B2 | 5/2004 | Dybdal et al. |
| 6,937,186 B1 | 8/2005 | Dybdal et al. |
| 7,136,621 B2 | 11/2006 | De La Chapelle et al. |
| 7,437,125 B2 | 10/2008 | McLain et al. |
| 7,640,024 B2 | 12/2009 | Goren |
| 7,911,400 B2 | 3/2011 | Kaplan et al. |
| 8,639,182 B2 | 1/2014 | Moore, III |
| 9,608,716 B1 * | 3/2017 | Elwailly ............ H04B 7/18519 |
| 2004/0242152 A1 * | 12/2004 | Jarett ................... H04B 7/2041 455/12.1 |
| 2014/0045420 A1 | 2/2014 | Tong et al. |
| 2014/0070993 A1 | 3/2014 | Hopkins et al. |
| 2014/0145887 A1 * | 5/2014 | Irvine ..................... H01Q 3/08 343/713 |
| 2015/0092657 A1 | 4/2015 | Ferrarotti et al. |
| 2015/0215029 A1 | 7/2015 | Lemme |

OTHER PUBLICATIONS

Global VSAT Forum, "Performance and Test Guidelines for Type Approval of Comms on the Move: Mobile Satellite Communication Terminals", FVF-105, Released Aug. 2013, http://www/asbu.net/medias/satellite_interference/2.5%20ASBU%20Plan%20GVF-105%20[Aug. 2013]%20Released%20Document%20Attachment.pdf., 30 pgs.

Weerackody et al., "Technical Challenges and Perfomance of Satellite Communications on the Move Systems", John Hopkins APL Technical Digest, vol. 30, No. 2, 2011, pp. 113-121.

* cited by examiner

20
METHODS AND SYSTEMS FOR PERFORMING ANTENNA POINTING WHILE MITIGATING INTERFERENCE WITH A NEARBY SATELLITE

CROSS REFERENCE

The present Application for Patent is a Continuation of U.S. patent application Ser. No. 15/269,355 by Petranovich et al., entitled "METHODS AND SYSTEMS FOR PERFORMING ANTENNA POINTING WHILE MITIGATING INTERFERENCE WITH A NEARBY SATELLITE," filed Sep. 19, 2016, assigned to the assignee hereof, and expressly incorporated herein.

BACKGROUND

The present disclosure relates generally to satellite communications, and more specifically to systems and methods for accurate antenna pointing in satellite communications while avoiding excessive interference with one or more non-target satellites.

An Earth-based antenna terminal for communication with a satellite typically has high antenna gain and a narrow beam pointed at the satellite, because of the large distance to the satellite and to avoid interference with other satellites. Mobile antenna terminals can include a positioner to maintain pointing (or tracking) of the beam of the antenna at the satellite during movement.

Pointing error (or misalignment) between the boresight direction of maximum gain of the beam and the actual direction of the satellite can have a detrimental effect on the quality of the link between the antenna and the satellite. Small misalignment may be compensated for by reducing a modulation and coding rate of signals communicated between the antenna and the satellite. However, to maintain a given data rate (e.g., bits-per-second (bps)), this approach may increase system resource usage and thus result in inefficient use of the resources. Pointing error can also make it more challenging to ensure compliance with interference requirements with other satellites that are imposed by regulatory agencies (e.g., FCC, ITU, etc.) and/or a coordination agreement with operators of the other satellites.

The pointing error may increase with time due to various factors such as drift of a sensor (e.g., an inertial reference unit (IRU)) associated with mobile antenna terminal, structural deflections caused by movement and other disturbances, etc. In order to correct this pointing error, the mobile antenna terminal may occasionally perform a signal-based mispointing correction operation such as steptrack, conical scan and similar methods. The mispointing correction operation can include moving the beam of the antenna in an attempt to determine the direction at which a signal metric (e.g., signal strength) of a signal communicated with satellite is maximized.

SUMMARY

In one embodiment, a method is described that includes communicating a signal between an antenna system on a mobile vehicle and a target satellite. The method further includes obtaining a current geographic location of the mobile vehicle. The method further includes determining if the current geographic location is within an acceptable geographic region for performing a first mispointing correction operation of the antenna system. The acceptable geographic region corresponds to interference by the communicated signal with a non-target satellite due to the first mispointing correction operation that is below a threshold. The method further includes performing the first mispointing correction operation of the antenna system if the current geographic location is within the acceptable geographic region.

In another embodiment, an antenna system for mounting on a mobile vehicle is described. The antenna system includes an antenna having a beam for communicating a signal with a target satellite. The antenna system further includes a pointing adjustment mechanism coupled to the antenna and responsive to a control signal to adjust an angular position of the beam of the antenna. The antenna system further includes an antenna control unit to obtain a current geographic location of the mobile vehicle. The antenna control unit further determines if the current geographic location is within an acceptable geographic region for performing a first mispointing correction operation of the antenna system. The acceptable geographic region corresponds to interference by the communicated signal with a non-target satellite due to the first mispointing correction operation that is below a threshold. The antenna control unit further provides the control signal to the pointing adjustment mechanism to perform the first mispointing correction operation of the antenna system if the current geographic location is within the acceptable geographic region.

Other aspects and advantages of the present disclosure can be seen on review of the drawings, the detailed description, and the claims which follow.

DETAILED DESCRIPTION

Systems and methods are described herein for performing mispointing correction operations of a mobile antenna system that can be used to provide accurate pointing of an antenna towards a satellite (e.g., a geostationary satellite), while also satisfying interference requirements with one or more other satellites. In particular, the mispointing correction operations described herein take into consideration the interference requirements of the other satellites. In doing so, the mobile antenna system can correct pointing errors from time to time in order to maintain accurate pointing at the satellite, while also avoiding excessive interference that could result due to intentional mispointing introduced during the mispointing correction operations.

As a result, the mispointing correction operations described herein can improve resource efficiency of communication systems using such antennas. For example, achieving accurate pointing may reduce the necessary system resources for maintaining a given data rate by increasing the allowable coding rate (e.g., decreasing data redundancy), which may increase overall system performance.

Figure 1:
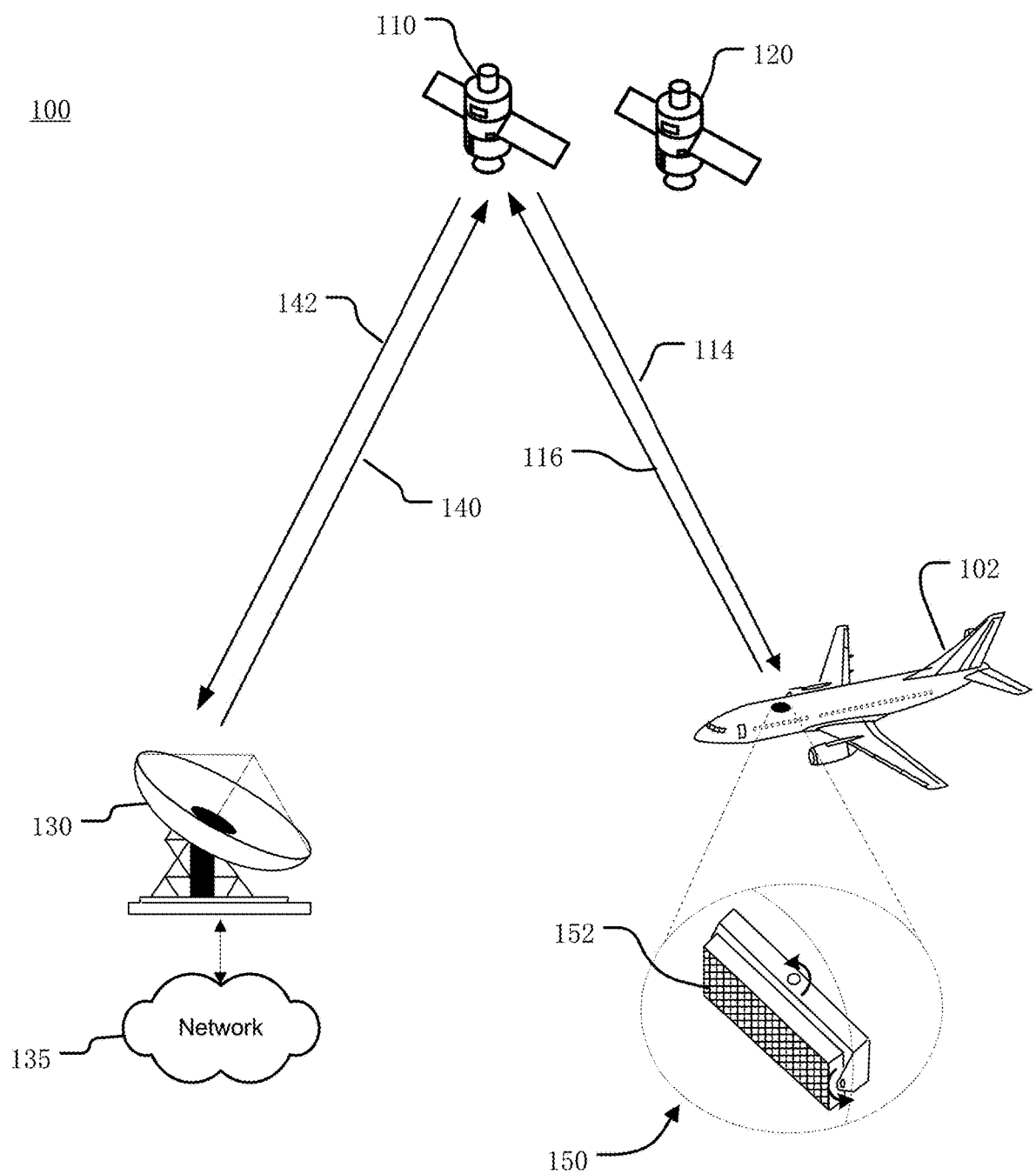
FIG. 1 illustrates an example satellite communications system in which an antenna system as described herein can be used to provide very accurate pointing towards a satellite while also avoiding excessive interference with one or more other satellites.

FIG. 1 illustrates an example satellite communications system 100 in which an antenna system 150 as described herein can be used to provide very accurate pointing towards satellite 110 (referred to hereinafter as "target satellite 110") while also avoiding excessive interference with one or more other satellites. Many other configurations are possible having more or fewer components than the satellite communications system 100 of FIG. 1.

In the illustrated embodiment, the antenna system 150 is mounted on aircraft 102, which in this example is an airplane. More generally, the antenna system 150 can be mounted on various types of mobile vehicles such as aircraft (e.g., airplanes, helicopters, drones, blimps, balloons, etc.), trains, automobiles (e.g., cars, trucks, busses, etc.), watercraft (e.g., private boats, commercial shipping vessels, cruise ships, etc.) and others. In the following examples, the techniques described herein for performing mispointing correction operations are described in conjunction with the aircraft 102. Alternatively, the mispointing correction operations may be used in conjunction with other mobile vehicles such as those mentioned above.

As described in more detail below, the antenna system 150 includes an antenna 152 producing a beam that facilitates communication between the aircraft 102 and the target satellite 110. In the illustrated embodiment, the antenna 152 is an array of waveguide antenna elements arranged in a rectangular panel. Each of the one or more antenna elements can include a waveguide-type feed structure including a horn antenna. Alternatively, the antenna 152 may be a different type of antenna, such as a reflector antenna, a phased array, a slot array, etc.

The antenna system 150 also includes a pointing adjustment mechanism such as a mechanical positioner (not shown) responsive to a control signal from an antenna control unit (not shown) to provide very accurate pointing of the beam of the antenna 152 at the target satellite 110 using the techniques described herein. In some embodiments described herein the antenna system 150 is used for bidirectional (two-way) communication with the target satellite 110. In other embodiments, the antenna system 150 may be used for unidirectional communication with the target satellite 110, such as a receive-only implementation (e.g., receiving satellite broadcast television). Although only one antenna system 150 is illustrated in FIG. 1 to avoid over complication of the drawing, the satellite communications system 100 may include many antenna systems 150.

As used herein, a beam of an antenna that is pointed at a target satellite has sufficient antenna gain in the direction of the satellite to permit communication of one or more signals. The communication can be bidirectional (i.e., the antenna transmits a signal to the satellite and also receives a signal from the satellite) or unidirectional (i.e., the antenna either transmits a signal to the satellite or receives a signal from the satellite, but not both). The direction of the target satellite may be the boresight direction of maximum gain of the beam. Alternatively, the gain of the beam in the direction of the target satellite may be less than the maximum gain of the beam. This may for example be due to pointing accuracy limitations of the antenna. The difference between the boresight direction of the beam and the direction of the target satellite is referred to herein as the pointing error.

In the illustrated embodiment, the target satellite 110 provides bidirectional communication between the aircraft 102 and a gateway terminal 130. The gateway terminal 130 is sometimes referred to as a hub or ground station. The gateway terminal 130 includes an antenna to transmit a forward uplink signal 140 to the target satellite 110 and receive a return downlink signal 142 from the target satellite 110. The gateway terminal 130 can also schedule traffic to the antenna system 150. Alternatively, the scheduling can be performed in other parts of the satellite communications system 100 (e.g., a core node, or other components, not shown). Signals 140, 142 communicated between the gateway terminal 130 and the target satellite 110 can use the same, overlapping, or different frequencies as signals 114, 116 communicated between the target satellite 110 and the antenna system 150.

Network 135 is interfaced with the gateway terminal 130. The network 135 can be any type of network and can include for example, the Internet, an IP network, an intranet, a wide area network (WAN), a virtual LAN (VLAN), a fiber optic network, a cable network, a public switched telephone network (PSTN), a public switched data network (PSDN), a public land mobile network, and/or any other type of network supporting communication between devices as described herein. The network 135 can include both wired and wireless connections as well as optical links. The network 135 can connect multiple gateway terminals 130 that can be in communication with target satellite 110 and/or with other satellites.

The gateway terminal 130 can be provided as an interface between the network 135 and the target satellite 110. The gateway terminal 130 can be configured to receive data and information directed to the antenna system 150 from a source accessible via the network 135. The gateway terminal 130 can format the data and information and transmit forward uplink signal 140 to the target satellite 110 for delivery to the antenna system 150. Similarly, the gateway terminal 130 can be configured to receive return downlink signal 142 from the target satellite 110 (e.g., containing data and information originating from the antenna system 150) that is directed to a destination accessible via the network 135. The gateway terminal 130 can also format the received return downlink signal 142 for transmission on the network 135.

The target satellite 110 can receive the forward uplink signal 140 from the gateway terminal 130 and transmit corresponding forward downlink signal 114 to the antenna system 150. Similarly, the target satellite 110 can receive return uplink signal 116 from the antenna system 150 and transmit corresponding return downlink signal 142 to the gateway terminal 130. The target satellite 110 can operate in a multiple spot beam mode, transmitting and receiving a number of narrow beams directed to different regions on Earth. Alternatively, the target satellite 110 can operate in wide area coverage beam mode, transmitting one or more wide area coverage beams.

The target satellite 110 can be configured as a "bent pipe" satellite that performs frequency and polarization conversion of the received signals before retransmission of the signals to their destination. As another example, the target satellite 110 can be configured as a regenerative satellite that demodulates and remodulates the received signals before retransmission.

As shown in FIG. 1, the satellite communications system 100 also includes another satellite 120 (hereinafter referred to as "non-target satellite 120"). Communication of one or more signals between the non-target satellite 120 and the antenna system 150 is undesired or unintended. Although only one non-target satellite 120 is illustrated in FIG. 1 to avoid over complication of the drawing, the satellite communications system 100 can include many more non-target satellites 120 and the techniques described herein can be used to avoid excessive interference with each of the non-target satellites 120.

The non-target satellite 120 can, for example, be configured as a bent pipe or regenerative satellite. The non-target satellite 120 can communicate one or more signals with one or more ground stations (not shown) and/or other terminals (not shown).

As mentioned above, the antenna system 150 includes antenna 152 that produces a beam pointed at the target satellite 110 via the pointing adjustment mechanism to provide for transmission of the return uplink signal 116 and reception of the forward downlink signal 114. Based on the location of the target satellite 110 and the location and attitude (yaw, roll and pitch) of the aircraft 102, the antenna control unit of the antenna system 150 provides a control signal to the pointing adjustment mechanism to change the angular position of the beam to maintain pointing of the beam of the antenna 152 at the target satellite 110 as the aircraft 102 moves. However, various factors such as drift of a navigation sensor (e.g., an inertial reference unit (IRU)) on the aircraft 102, structural deflections of the aircraft 102 caused by takeoff, movement and other disturbances, etc., can cause the pointing error to increase with time.

Thus, from time-to-time, the antenna control unit also provides appropriate values of the control signal to the pointing adjustment mechanism to perform a mispointing correction operation, while also avoiding excessive interference with the non-target satellite 120, using the techniques described herein. In particular, the mispointing correction operation takes into consideration the interference requirement of the non-target satellite 120, so that excessive interference with the non-target satellite 120 is avoided. The mispointing correction operation is described in more detail below with respect to subsequent Figures.

As used herein, interference "with" the non-target satellite 120 can refer to uplink interference and/or downlink interference. Uplink interference is interference to the non-target satellite 120 caused by a portion of the return uplink signal 116 transmitted by the antenna system 150 that is received by the non-target satellite 120. Downlink interference is interference to the antenna system 150 caused by a portion of a signal transmitted by the non-target satellite 120 that is received by the antenna system 150.

In the illustrated embodiment, the target satellite 110 and the non-target satellite 120 are each geostationary satellites. The geostationary orbit slots, and thus the angular separation along the geostationary arc between the target satellite 110 and the non-target satellite 120, can vary from embodiment to embodiment. In some embodiments, the angular separation along the geostationary arc is at least two degrees. In alternative embodiments, one or both of the target satellite 110 and the non-target satellite 120 can be a non-geostationary satellite, such as a LEO or MEO satellite.

Figure 2:
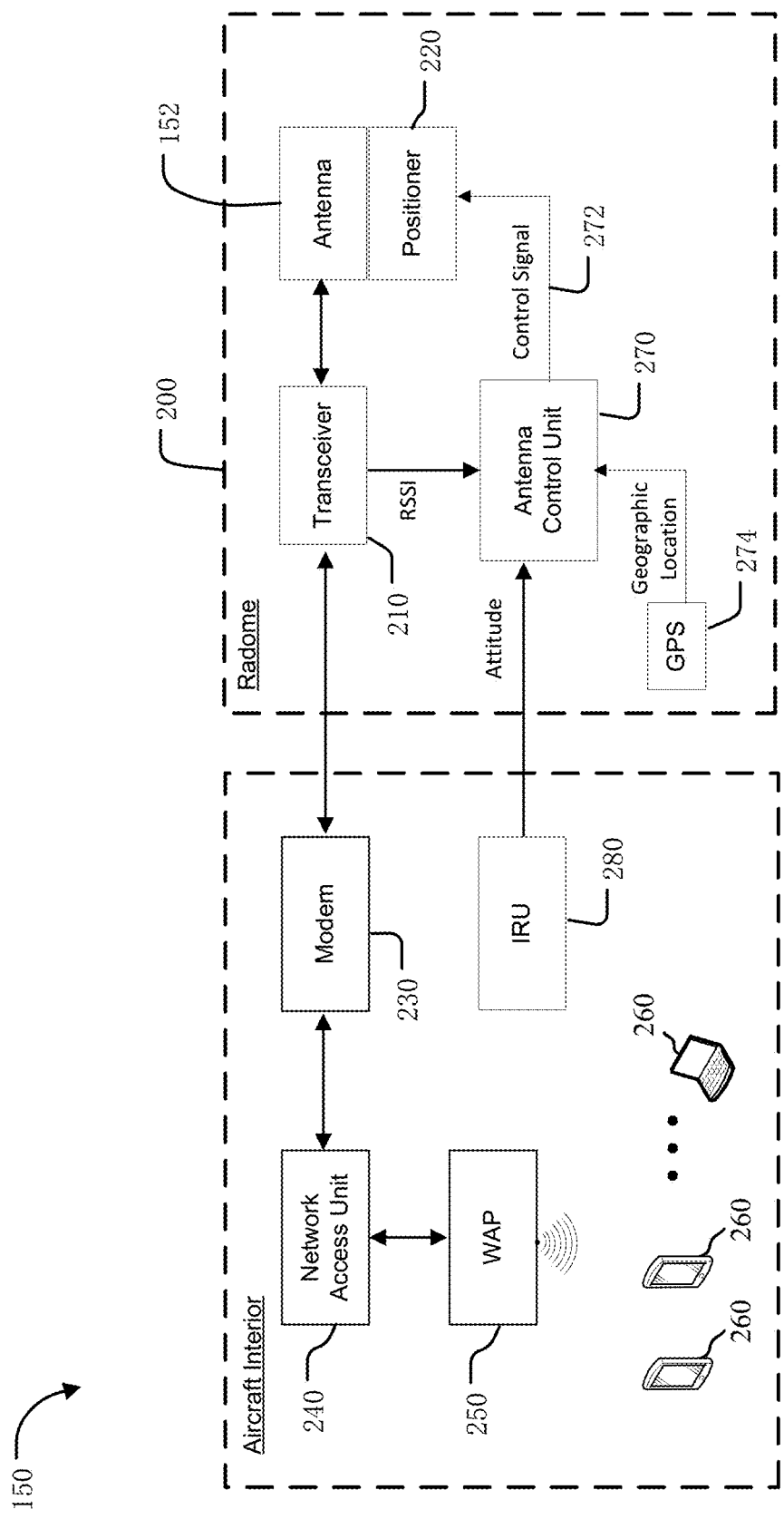
FIG. 2 is a block diagram illustrating an example antenna system on the aircraft of FIG. 1.

FIG. 2 is a block diagram illustrating an example antenna system 150 on the aircraft 102 of FIG. 1. Many other configurations are possible having more or fewer components than the antenna system 150 shown in FIG. 2. Moreover, the functionalities described herein can be distributed among the components in a different manner than described herein.

The antenna system 150 includes antenna 152 that is housed under radome 200 disposed on the top of the fuselage or other location (e.g., on the tail, etc.) of the aircraft 102. The antenna 152 produces a beam that can provide for transmission of the return uplink signal 116 and reception of the forward downlink signal 114 to support two-way data communication between data devices 260 within the aircraft 102 and the network 135 via target satellite 110 and gateway terminal 130. The data devices 260 can include mobile devices (e.g., smartphones, laptops, tablets, netbooks, and the like) such as personal electronic devices (PEDs) brought onto the aircraft 102 by passengers. As further examples, the data devices 260 can include passenger seat back systems or other devices on the aircraft 102. The data devices 260 can communicate with network access unit 340 via a communication link that can be wired or wireless. The communication link can be, for example, part of a local area network such as a wireless local area network (WLAN) supported by wireless access point (WAP) 250. One or more WAPs can be distributed about the aircraft 102, and can, in conjunction with network access unit 240, provide traffic switching or routing functionality. The network access unit 240 can also allow passengers to access one or more servers (not shown) local to the aircraft 102, such as a server that provides in-flight entertainment.

In operation, the network access unit 240 can provide uplink data received from the data devices 260 to modem 230 to generate modulated uplink data (e.g., a transmit IF signal) for delivery to transceiver 210. The transceiver 210 can then upconvert and then amplify the modulated uplink data to generate the return uplink signal 116 for transmission to the target satellite 110 via the antenna 152. Similarly, the transceiver 210 can receive the forward downlink signal 114 from the target satellite 110 via the antenna 152. The transceiver 210 can amplify and then downconvert the forward downlink signal 114 to generate modulated downlink data (e.g., a receive IF signal) for demodulation by the modem 230. The demodulated downlink data from the modem 230 can then be provided to the network access unit 240 for routing to the data devices 260. The modem 230 can be integrated with the network access unit 240, or can be a separate component, in some examples.

In the illustrated embodiment, the transceiver 210 is located outside the fuselage of the aircraft 102 and under the radome 200. Alternatively, the transceiver 210 can be located in a different location, such as within the aircraft interior.

In the illustrated embodiment and subsequent examples, the antenna system 150 includes positioner 220 coupled to the antenna 152. Alternatively, the antenna system 150 may include a different pointing adjustment mechanism that may vary from embodiment to embodiment, and may depend on the antenna type of the antenna 152.

The positioner 220 is responsive to a control signal on line 272 from antenna control unit 270 to mechanically point the beam of the antenna 152 in the direction of the target satellite 110 as the aircraft 102 moves. Accordingly, the values of the control signal on line 272 to adjust the angular position of the beam depend on the manner in which the positioner 220 (or other pointing adjustment mechanism) is controlled, and can vary from embodiment to embodiment. Although only a single line 272 and a single control signal are shown in FIG. 2, as used herein "control signal" can include one or more separate control signals provided by the antenna control unit 270 to the positioner 220 (or other pointing adjustment mechanism), which in turn may be provided on one or more lines. For example, in some embodiments in which the pointing adjustment mechanism adjusts the angular position of the beam in multiple axes (e.g., azimuth and elevation), the control signal includes a control signal indicating the angular value of each axis.

In some embodiments, the boresight direction of the beam of the antenna 152 is fixed relative to the aperture of the antenna 152. For example, the antenna 152 may be a direct radiating two-dimensional array which results in boresight being normal to a plane containing the antenna elements of the array. As another example, the antenna 152 may be a reflector antenna. In such a case, the antenna 152 can be fully mechanically steered by the positioner 220 to point the beam at the target satellite 110. For example, the positioner 220 may be an elevation-over-azimuth (EL/AZ), two-axis positioner that provides adjustment in azimuth and elevation. As another example, the positioner 220 may be a three-axis positioner to provide adjustment in azimuth, elevation and skew.

In some embodiments, the antenna 152 is an electro-mechanically steered array that includes one mechanical scan axis and one electrical scan axis, such as a variably inclined continuous transverse stub (VICTS) antenna. In such a case, the pointing adjustment mechanism can include a combination of mechanical and electrical scanning mechanisms.

In some embodiments, the antenna 152 is a non-movable, fully electronic scanned phased array antenna. In such a case, the pointing adjustment mechanism can include feed networks and phase controlling devices to properly phase signals communicated with some or all of the antenna elements of the antenna 152 to scan the beam in azimuth and elevation.

As mentioned above, the antenna control unit 270 provides a control signal on line 272 to positioner 220 to point the beam of the antenna 152. The functions of the antenna control unit 270 can be implemented in hardware, instructions embodied in memory and formatted to be executed by one or more general or application specific processors, firmware, or any combination thereof.

During normal operation, as the aircraft 102 moves relative to the target satellite 110, the antenna control unit 270 provides the control signal on line 272 to positioner 220 to point the beam of the antenna 152 in the appropriate angular position in the direction of the target satellite 110. The antenna control unit 270 may determine the appropriate angular position based on the location of the target satellite 110, the location of the aircraft 102, and the attitude (including yaw, roll, and pitch) of the aircraft 102. The antenna control unit 270 may for example store (or otherwise obtain) data indicating the location of the target satellite 110. The geographic location of the aircraft 102 may for example be obtained via a global positioning system (GPS) 274 or other equipment on the aircraft 102. The attitude of the aircraft 102 may for example be provided via an inertial reference unit (IRU) 380 on the aircraft 102.

From time to time, the antenna control unit 270 also provides the control signal on line 272 to perform a re-pointing process described herein to reduce pointing error at the target satellite 110, while also avoiding excessive interference with the non-target satellite 120. As described in more detail below, the re-pointing process described herein takes into consideration the interference requirement of the non-target satellite 120 when determining whether or not to perform a particular (e.g., preferred or default) mispointing correction operation. This particular mispointing correction operation is referred to hereinafter as a "first mispointing correction operation".

When the antenna system 150 (and thus the aircraft 102) is at certain geographic locations, the intentional mispointing introduced by the first mispointing correction operation is such that the antenna system 150 still satisfies interference requirement with the non-target satellite 120. In other words, the interference due to the combination of an expected pointing error (e.g., a maximum or peak pointing error) at the target satellite 110 and the intentional mispointing, is within acceptable limits (i.e., below a threshold) to the non-target satellite 120. These certain geographic locations are referred to herein as an "acceptable geographic region" for performing the first mispointing correction operation. The geographic locations that are within the acceptable geographic region, and whether it is continuous or discontinuous, can vary from embodiment to embodiment depending on various factors described below. Outside of the acceptable geographic region, the use of the particular mispointing correction operation is precluded due to the interference requirement. It is worth noting that the antenna system 150 may still be used for normal operations outside some or all of the acceptable geographic region, as the interference due to the worst-case pointing error without intentional mispointing may by itself still be within acceptable limits to the non-target satellite 120.

The value of the threshold below which the amount of amount of interference to the non-target satellite 120 is acceptable can for example be based on regulatory requirements imposed by regulatory agencies (e.g., FCC, ITU, etc.) on the maximum power spectral density (or other metric) that can be radiated to the non-target satellite 120, and/or coordination agreements with the operator of the non-target satellite 120. Additionally, the threshold can account for pointing accuracy limitations of the antenna 152 during normal operations.

The antenna control unit 270 can determine whether or not to perform the first mispointing correction operation based on whether or not the current geographic location of the aircraft 102 is within the acceptable geographic region. The current geographic location may for example be provided via the GPS 274 or other equipment on the aircraft 102.

The amount of interference if the first mispointing correction operation were performed at a given geographic location can be determined using various techniques, and can be characterized or represented in different ways. For example, in some embodiments the amount of interference is represented in terms of power spectral density (PSD).

The amount of uplink interference can for example be determined based one or more of the known antenna pattern characteristics of the antenna 152, the transmission parameters (e.g., transmit power, frequency range, etc.) of the return uplink signal 116, the parameters (e.g., angular positions) of the first mispointing correction operation, the geographic location of the aircraft 102, the attitude of the aircraft 102, the locations of the target satellite 110 and non-target satellite 120, the operating frequency, system gain-to-noise temperature (G/T) and/or polarization of operation of the non-target satellite 120, etc. Alternatively, other and/or additional information can be used to calculate the amount of interference. The amount of downlink interference can be calculated in a similar manner based on the parameters of a signal from the non-target satellite 120 that is received by the antenna system 150.

In some embodiments, the comparison of the threshold amount of interference to the amount of interference at the various geographic locations if the first mispointing correction operation were performed has been previously calculated. In such a case, the antenna control unit 270 (or other component) can store a look-up table indicating whether or not performing the first mispointing correction operation is permitted at each the various geographic locations.

In embodiments in which one or both of the target satellite 110 and the non-target satellite 120 are non-geostationary satellites, the acceptable geographic region may change over time depending on the current locations of the target satellite 110 and the non-target satellite 120. For example, at a first time, the effective angular separation between the target satellite 110 and the non-target satellite 120 as viewed at a particular geographic location may be small enough that the interference due to intentional mispointing of the first mispointing correction operation would exceed the threshold. However, at a second time, due to the movement of the target satellite 110 relative to the non-target satellite 120, the effective angular separation as viewed at that particular geographic location may be large enough that the first mispointing correction operation can be performed while still satisfying the interference requirement. In such a case, the look-up table may include the various possible locations of the target satellite 110 and/or the non-target satellite 120. The antenna control unit 270 may determine whether or not performing the first mispointing correction operation is permitted based on the current locations of the target satellite 110 and/or the non-target satellite 120.

During the first mispointing correction operation, the antenna control unit 270 can provide control signal on line 272 to positioner 220 to adjust the beam of the antenna 152 to various angular positions of a correction profile (discussed below). At the same time, the antenna control unit 270 obtains an indication of signal strength (or other signal metric such as signal-to-noise ratio, bit-error rate, etc.) of a signal communicated with the target satellite 110 while at the various angular positions. The manner in which the beam of the antenna 152 is adjusted to the various angular positions is discussed in more detail below.

In the illustrated embodiment, the antenna control unit 270 obtains a received signal strength indicator (RSSI) from the transceiver 210 (or the modem 230 or other component) indicating the signal strength of the forward downlink signal 114 received by the antenna 152 at the various angular positions. Alternatively, other techniques may be used. For example, in some embodiments, the mispointing correction operation may also or alternatively use the signal strength (or other signal metric) of a signal transmitted by the antenna 152 to the target satellite 110, such as the return uplink signal 116. In such a case, the antenna control unit 270 may obtain the value of signal strength (or other signal metric) of the return uplink signal 116 that was received by the target satellite 110 from the gateway terminal 130 (or other elements of the satellite communications system 100 such as a core node, NOC, etc.) via the forward downlink signal 114.

The antenna control unit 270 can then select the final angular position to point the beam of the antenna 152 based on the measured signal metric at the various angular positions. The antenna control unit 270 may use a variety of techniques to select the final angular position. For example, the antenna control unit 270 may fit the measurements to a 2-D or 3-D curve depending upon the correction profile of the first mispointing correction operation, and then select the angular position corresponding to the maximum signal metric (e.g., maximum signal strength). Alternatively, other techniques may be used. The antenna control unit 270 can then provide the control signal to the positioner 220 to adjust the beam of the antenna 152 to point in the selected angular position. The antenna control unit 270 can then return to normal operations, and provide further adjustments to the angular position of the beam as the aircraft 102 moves relative to the target satellite 110.

Figure 3:
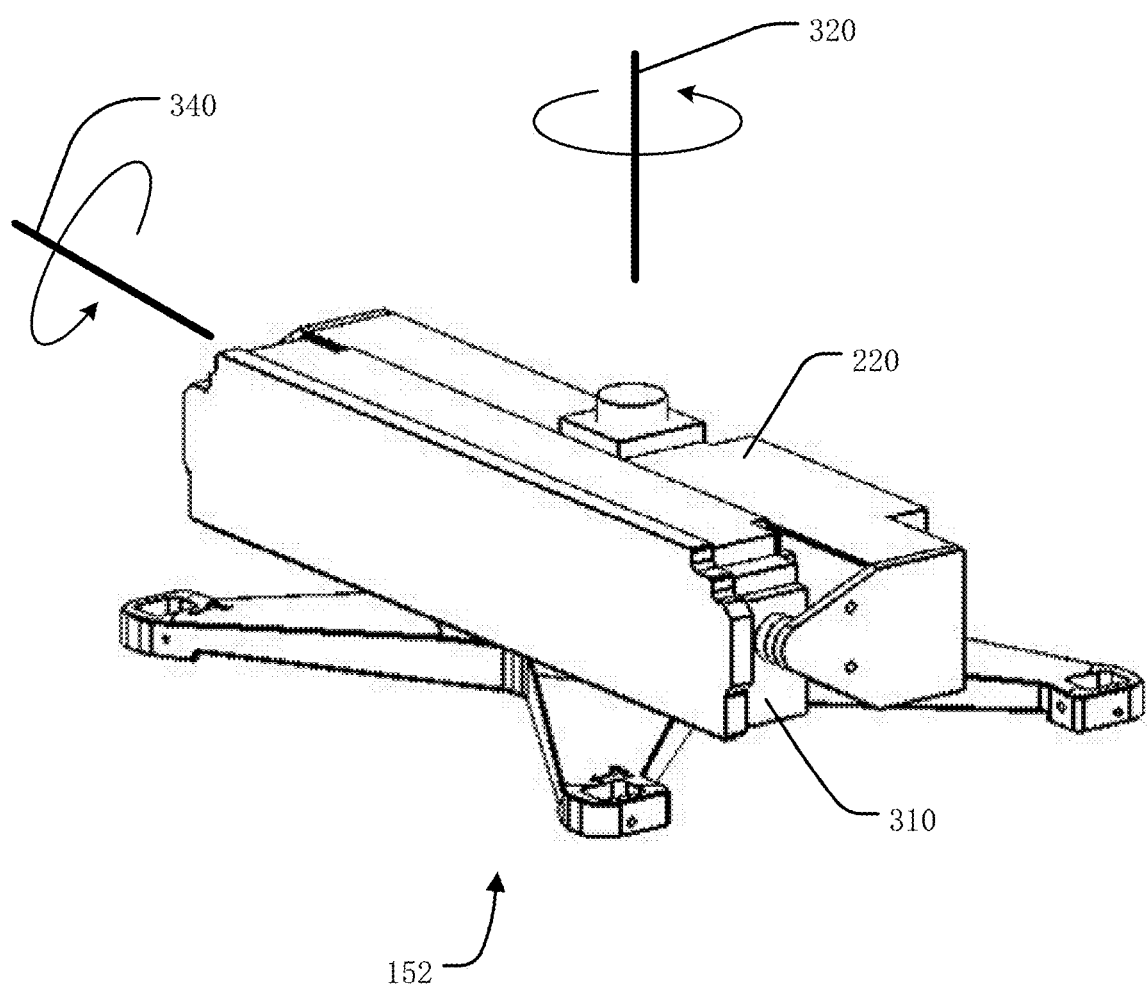
FIG. 3 illustrates a perspective view of an example of an antenna and positioner of an example antenna system described herein.

FIG. 3 illustrates a perspective view of an example of antenna 152 and positioner 220 of antenna system 150. In the illustrated embodiment, the antenna 152 includes an array 310 of antenna elements that is a direct radiating two-dimensional array which results in boresight being normal to a plane containing the antenna elements of the array 310. Alternatively, the array 310 of antenna elements can be arranged or fed in a different manner such that boresight is not normal to the plane containing the antenna elements of the array 310. As mentioned above, in other embodiments the antenna type of the antenna 152 may be different.

The positioner 220 is responsive to control signal provided by the antenna control unit 270 (see FIG. 2) to point the beam of the antenna 152 at the target satellite 110. In the illustrated embodiment, the positioner 220 is an elevation-over-azimuth (EL/AZ) two-axis positioner that provides full two-axis mechanical steering. The positioner 220 includes a mechanical azimuth adjustment mechanism to move the beam of the antenna 152 is azimuth 320, and a mechanical elevation adjustment mechanism to move the beam of the antenna 152 is elevation 340. Each of the mechanical adjustment mechanisms can for example include a motor with gears and other elements to provide for movement of the antenna 152 around a corresponding axis. As mentioned above, in other embodiments the pointing adjustment mechanism used to point the beam of the antenna 152 may be different than positioner 220.

Figure 4:
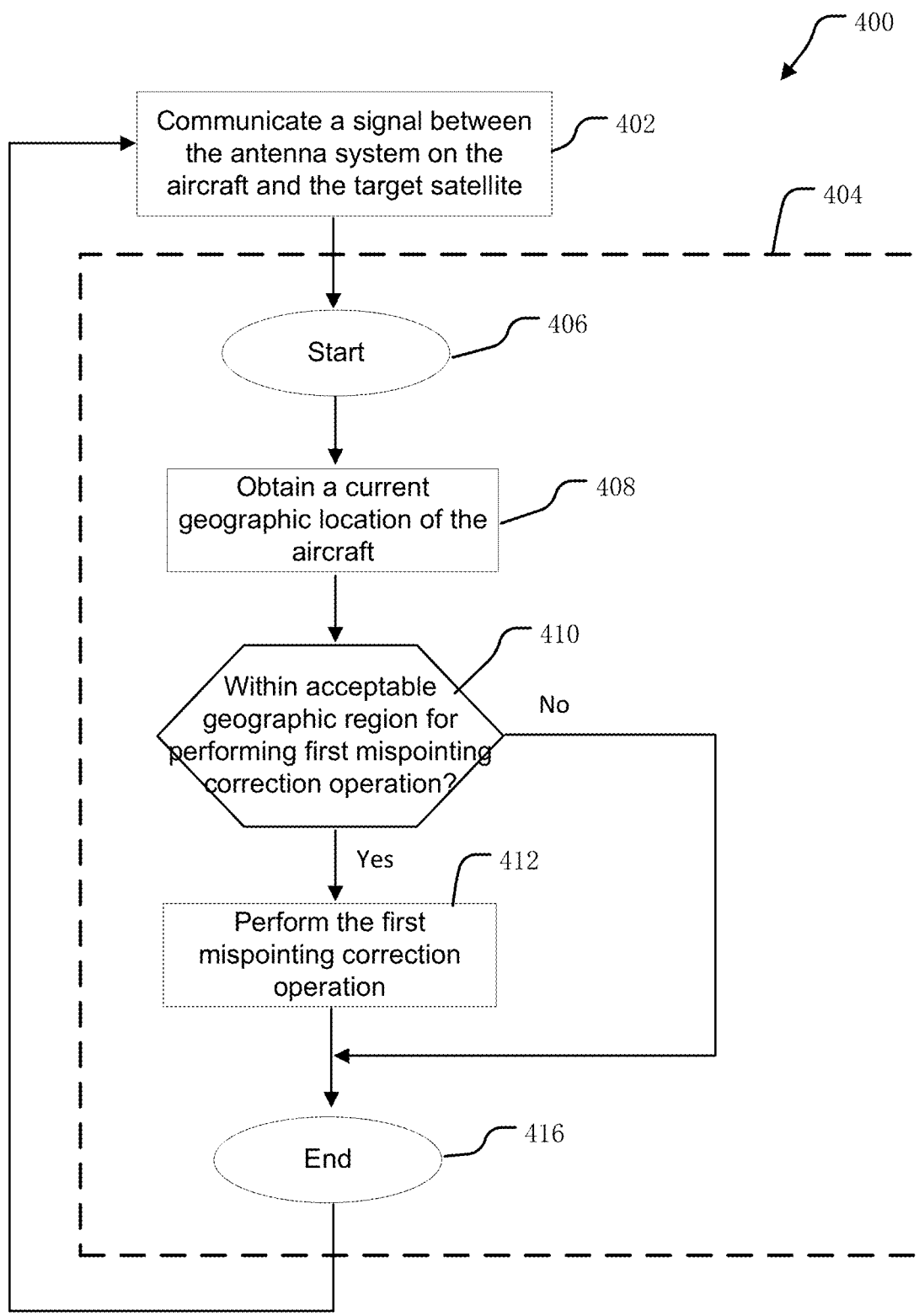
FIG. 4 illustrates an example process for operating the antenna system including performing an example re-pointing process by the antenna control unit of FIG. 2.

FIG. 4 illustrates an example process 400 for operating the antenna system 150 including performing an example re-pointing process 404 by the antenna control unit 270 of FIG. 2. Other embodiments can combine some of the steps, can perform the steps in different orders and/or perform different or additional steps to the ones illustrated in FIG. 3.

During step 402, the antenna system 150 is in normal operation, and a signal is communicated between the antenna system 150 on the aircraft 102 and the target satellite 110. In embodiments in which the antenna system 150 is in bidirectional communication with the target satellite 110, multiple signals (e.g., forward downlink signal 114, and return uplink signal 116) may be communicated during this step. As described above, as the aircraft 102 moves relative to the target satellite 110, the antenna control unit 270 provides the control signal on line 272 to positioner 220 to point the beam of the antenna 152 in the appropriate angular position in the direction of the target satellite 110.

Next, the re-pointing process 404 is initiated. The manner in which the re-pointing process 404 is initiated can vary from embodiment to embodiment. In examples described below, the antenna control unit 270 determines when to begin the re-pointing process 304, without receiving a command from an external device. In alternative embodiments, an external device may determine when to begin the re-pointing process 304 and provide a command to the antenna control unit 270. The command may for example be transmitted to the antenna control unit 270 by the gateway terminal 130 (or other elements of the satellite communications system 100 such as a core node, NOC, etc.) via the forward downlink signal 114. As another example, the command may be received from other equipment (e.g., modem 230, transceiver 210, etc.) of the antenna system 150 or other equipment on the aircraft 102.

The factor (or factors) by which the determination is made by the antenna control unit 270 to begin the re-pointing process 404 can vary from embodiment to embodiment. For example, in some embodiments the re-pointing process 404 is initiated upon determining that the antenna system 150 (and thus aircraft 102) has entered the acceptable geographic region for performing the first mispointing correction operation. Further examples of the factor (or factors) that may be used are discussed in more detail below with respect to FIGS. 9-12.

After starting the re-pointing process 404 at step 406, at step 408 the antenna control unit 270 obtains the current geographic location of the aircraft 102. The current geographic location of the aircraft 102 may for example be obtained from the GPS 274.

At step 410, the antenna control unit 270 determines whether the current geographic location is within the acceptable geographic region for performing the first mispointing correction operation. As described above, antenna control unit 270 may store a look-up table indicating whether or not performing the first mispointing correction operation is permitted at various geographic locations. In such a case, the antenna control unit 270 may use the look-up table to determine whether or not the first mispointing correction operation is permitted at the current geographic location.

If the determination is made that the current geographic location is within the acceptable geographic region, the process 400 continues to step 412. At step 412, the first mispointing correction operation is performed as discussed above. The re-pointing process 404 then ends at step 416.

If the determination is made that the current geographic location is not within the acceptable geographic region, the first mispointing correction operation is precluded due to the interference requirement with the non-target satellite 120, and the process 400 skips step 412 and ends at step 316. After step 416, the process 300 returns to step 302 and normal operation of the antenna system 150 resumes.

Figure 5:
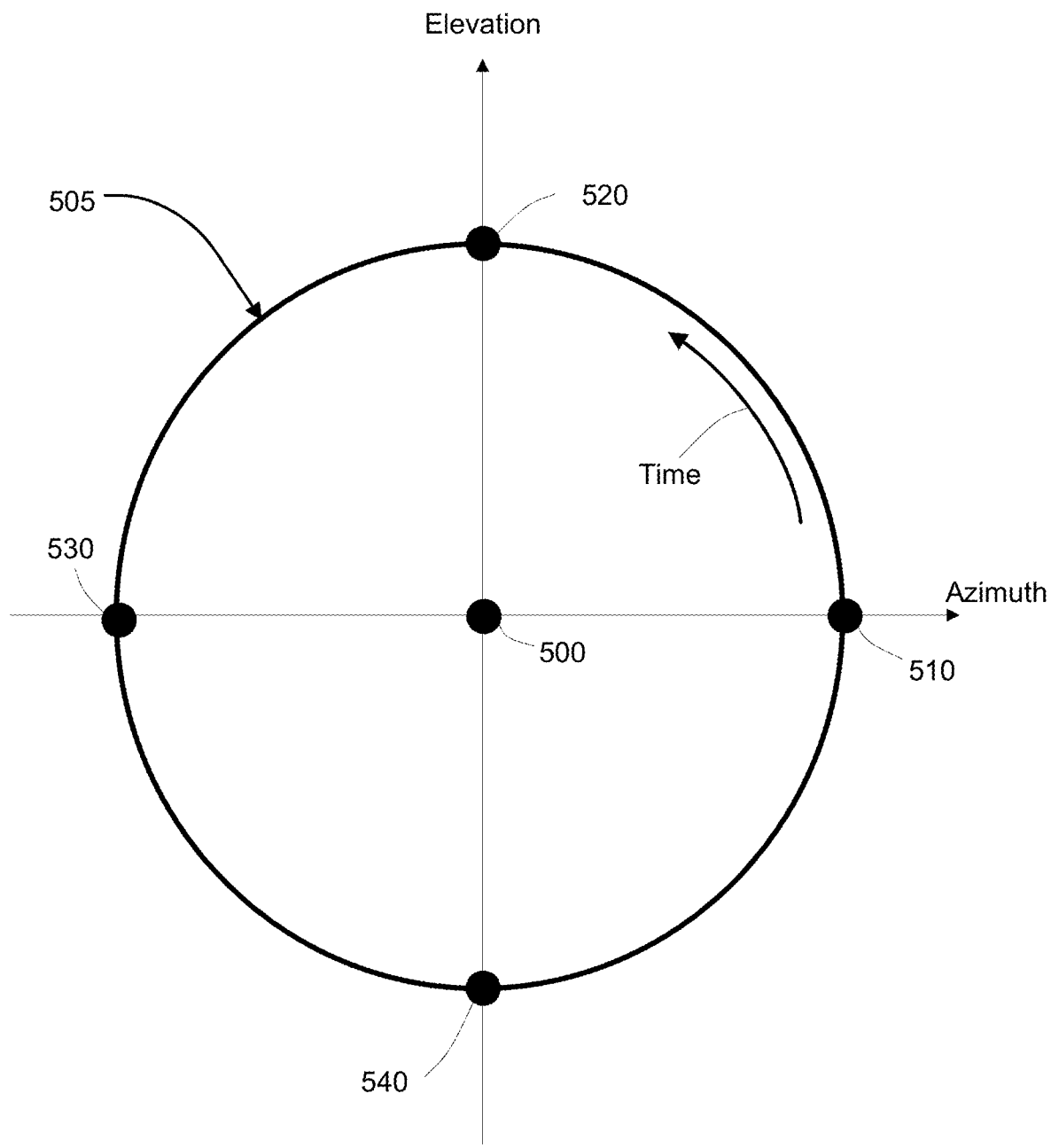
FIG. 5 illustrates an example of a correction profile of the first mispointing correction operation versus azimuth and elevation angles.

FIG. 5 illustrates an example of a correction profile 505 of the first mispointing correction operation versus azimuth and elevation angles. In the illustrated embodiment, the correction profile 505 is a two axis operation that simultaneously moves in both azimuth and elevation. Alternatively, the correction profile 505 may be different.

The plot of FIG. 5 is a projection of the angular positions onto a plane that is perpendicular to the initial angular position 500 extending out of the page. The correction profile 505 indicates the changes in azimuth and elevation angles relative to the initial angular position 500. At the beginning of the first mispointing correction operation, the initial angular position 500 is the direction the positioner 220 is pointing the beam of the antenna 152. As mentioned above, pointing error may have been introduced since the last mispointing correction operation was performed due to various factors. As a result, the initial angular position 500 may not correspond to the actual direction of the target satellite 110. In some embodiments, during the mispointing correction operation the antenna control unit 270 may continue to make adjustments to the initial angular position of the beam due to movement of the aircraft 102 relative to target satellite 110 in order to track the target satellite 110. In such a case, the actual values of the azimuth and elevation angles of the initial angular position 500 of the correction profile 505 may change during the mispointing correction operation. As a result, since the correction profile 505 is relative to the initial angular position 500, the actual values of the azimuth and elevation angles may also change.

As can be seen in FIG. 5, the correction profile 505 in FIG. 5 moves the angular position of the beam of the antenna 512 in a circular manner vs. time (counter-clockwise in this example). In other words, the correction profile 505 relative to the initial angular position 500 has a radius and an angular velocity. Alternatively, the correction profile 505 may be non-circular, such as being elliptical.

The antenna control unit 270 controls the positioner 220 to adjust the angular position of the beam of the antenna 152 along the correction profile 505. As mentioned above, at the same time, the antenna control unit 270 obtains an indication of signal strength (or other signal metric) of a signal (e.g., forward downlink signal 114) communicated with the target satellite 110 at various angular positions along the correction profile 505.

In the illustrated embodiment, the angular positions at which measurements are made include a first pair of angular positions 510, 530 along the azimuth axis, and a second pair of angular positions 520, 540 along the elevation axis. In other embodiments, the number of angular positions may be different such as including one or more intermediate angular positions between angular positions 510, 520, 530, 540, and/or may be oriented relative to azimuth axis and elevation axis in a different manner.

The number of cycles the beam is moved around the correction profile 505 can vary from embodiment to embodiment. Upon completing the desired number of cycles of the correction profile 505, the antenna control unit 270 can then estimate the actual direction of the target satellite 110 based on the final signal metric measurements made at the various angular positions. In some embodiments, the antenna control unit 270 may also obtain the signal metric when the beam of the antenna 152 was pointed at the initial angular position 500. A least-squares regression analysis or other technique may then be performed by the antenna control unit 270 to form a 3-D curve fitting the measured data. The antenna control unit 270 can then select the final angular position corresponding to the maximum signal metric of the 3-D curve.

The antenna control unit 270 can then provide the control signal to the positioner 220 to adjust the beam of the antenna 152 to point in the selected angular position. The antenna control unit 270 can then return to normal operations, and provide further adjustments to the angular position of the beam as the aircraft 102 moves around relative to the target satellite 110.

Figure 6:
FIG. 6 illustrates an example of an acceptable geographic region for performing the first mispointing correction operation.

FIG. 6 illustrates an example of an acceptable geographic region 650, 652 for performing the first mispointing correction operation. In the illustrated embodiment, the target satellite 110 and the non-target satellite 120 are each geostationary satellites.

In the illustrated embodiment, the target satellite 110 is a multi-spot beam satellite that includes spot beams 600, 610 having corresponding coverage areas. The corresponding coverage area may be any suitable shape.

Each spot beam provides communication service to terminals located at geographic locations within its corresponding coverage area. For each spot beam (e.g. spot beam 600), the satellite G/T is typically highest near the center of its coverage area and decreases towards the edges. Although only two spot beams 600, 610 are shown to avoid over complication of the drawing, the target satellite 110 may include many more spot beams.

In the illustrated embodiment, the antenna system 150 on the aircraft 102 employs return-link power control by making adjustments to the transmit power of transceiver 210, so that a particular power level of the return uplink signal 116 is maintained at the target satellite 110. A variety of open- or closed-loop power control techniques may be used.

Because the satellite G/T roll off towards the edges of each spot beam, in order to maintain the particular power level at the satellite 102 the antenna system 150 makes corresponding adjustments to the transmit power of the transceiver 210 as the aircraft 102 moves along a path 612. For example, the transmit power of the transceiver 210 when the aircraft 102 is at location 614 within spot beam 600 is higher than the transmit power when the aircraft 102 is at location 616 closer to the center of the spot beam 600.

Increasing the transmit power level toward the edges of each spot beam also increases the amount of interference generated by the antenna system 150 with the non-target satellite 120. In particular, these higher transmit power levels near the edges can result in excessive interference with the non-target satellite 120, if the first pointing correction operation were also performed there. As a result, in the illustrated embodiment, the acceptable geographic region 650 and 652 for performing the first mispointing correction operation are due to the return-link power control and corresponds to centers of the coverage areas of the spot beams 600, 610 of the target satellite 110.

The acceptable geographic region 650, 652 are geographic locations of the antenna system 150 (and thus the aircraft 102) where the amount of interference with the non-target satellite 120 when performing the first mispointing correction operation is below the threshold. In other words, within the acceptable geographic region 650, 652, the transmit power is sufficiently low enough that the intentional mispointing introduced during the first mispointing correction operation does not cause excessive interference with the non-target satellite 120.

Figure 7:
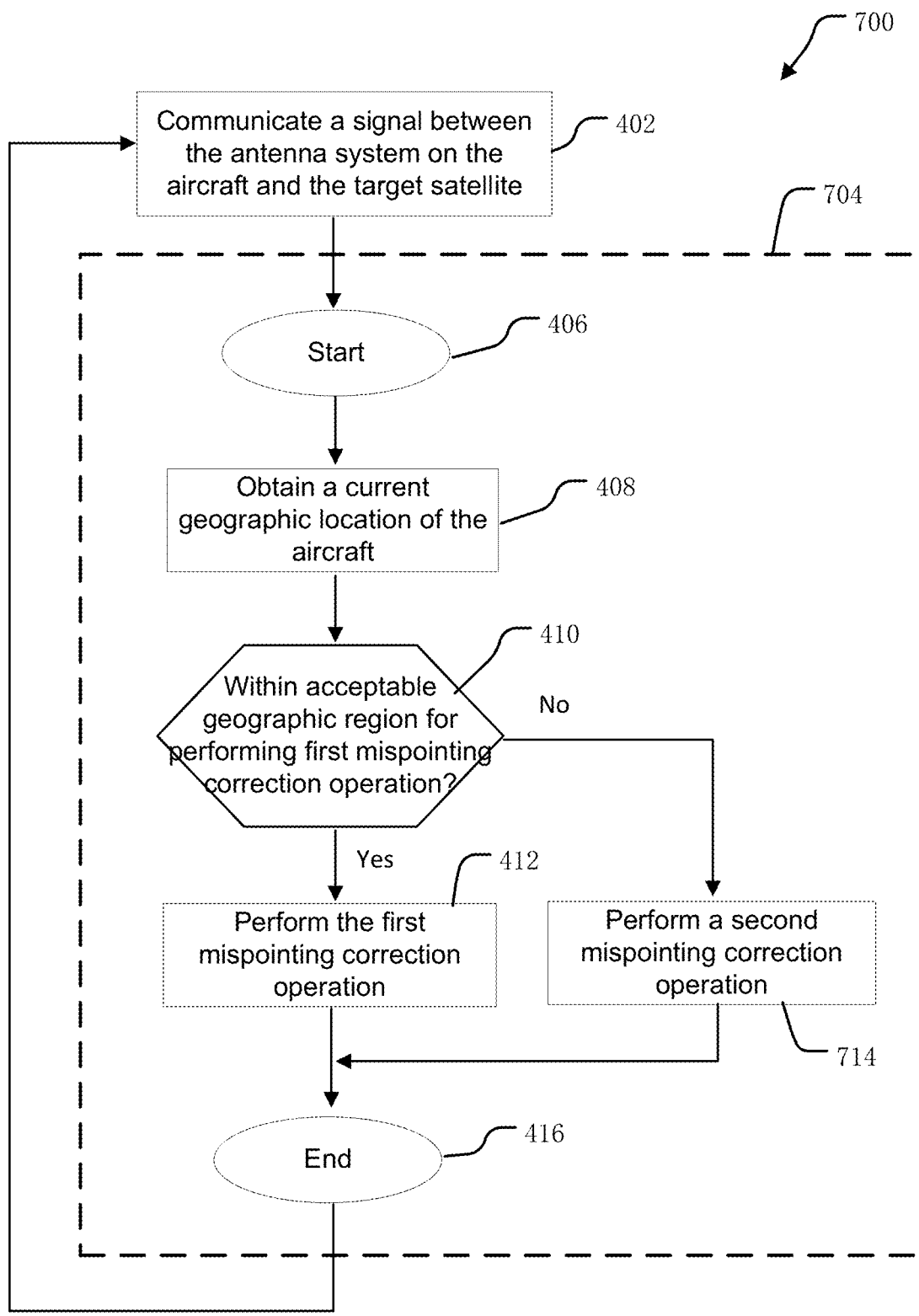
FIG. 7 illustrates an example process for operating the antenna system including performing an example re-pointing process by the antenna control unit of FIG. 2.

FIG. 7 illustrates an example process 700 for operating the antenna system 150 including performing an example re-pointing process 704 by the antenna control unit 270 of FIG. 2. As compared to the re-pointing process 404 of FIG. 4, the re-pointing process 704 of FIG. 7 includes step 714. The other steps of the re-pointing process 704 of FIG. 7 can be the same as the steps described above with respect to FIG. 4, and thus a description of those steps is not repeated here.

As shown in FIG. 7, if the determination is made at step 410 that the current geographic location is not within the acceptable geographic region for performing the mispointing correction operation, the process 400 continues to step 714. At step 714, a second mispointing correction operation is performed. The re-pointing process 404 then ends at step 416.

The second mispointing correction operation of step 714 has one or more parameters that are different than the first mispointing correction of step 712, such that that second mispointing correction operation can be performed outside of the acceptable geographic region for performing the mispointing correction operation. Thus, at a particular geographic location that is outside the acceptable geographic region for performing the mispointing correction operation, the second mispointing correction operation is such that the antenna system 150 still satisfies interference requirement with the non-target satellite 120.

In the illustrated embodiment, the second mispointing correction operation can be performed at all locations outside the acceptable geographic region of the first mispointing correction operation. Thus, the process 700 automatically performs step 714 if step 412 cannot be performed. In other embodiments, the second mispointing operation of step 714 may not be automatically performed. In such a case, after step 410, the antenna control unit 270 may determine whether the current geographic location is within the acceptable geographic region for performing the second mispointing correction operation. The techniques for determining whether the second mispointing correction operation can be performed at the current geographic location, can be similar to techniques described above for step 410.

The manner in which the second mispointing correction operation differs from the first mispointing correction operation can vary from embodiment to embodiment.

In some embodiments, one or more transmission parameters of the return uplink signal 116 during the second mispointing correction operation are different than that of the return uplink signal 116 during the first mispointing correction operation. For example, the antenna system 150 can change one or more of the transmitted power level of the return uplink signal 116, spreading the return uplink signal 116 over a larger bandwidth, or any other technique for reducing the power spectral density in the direction of the non-target satellite 120. Thus, if either one can be used while satisfying the interference requirement with the non-target satellite 120, the first mispointing correction operation may be preferred because it permits more efficient communication with the target satellite 110 than the second mispointing correction operation. In one embodiment, transmission of the return uplink signal 116 is muted (i.e., turned off) during the second mispointing correction operation.

In some embodiments, one or more angular positions along a correction profile of the second mispointing correction operation is different than the correction profile of the first mispointing correction operation. Examples of the differences between the corrections profiles of the first and second mispointing correction operations are discussed in more detail below with respect to FIG. 8.

In some embodiments in which the beam of the antenna 152 has an asymmetric beam pattern, the determination of whether to perform the first correction operation takes into account the skew angle of the beam. The asymmetric beam pattern can be due to a non-circular antenna aperture of the antenna 152. The non-circular shape can be due to the combination of electrical performance requirements and size constraints. Specifically, the non-circular antenna aperture can be designed to have a large enough effective area to provide sufficient antenna gain to satisfy link requirements between the aircraft 102 and the target satellite 110, while also having a swept volume small enough that it can be housed under an aerodynamic radome. The asymmetric beam pattern has a narrow beamwidth axis along the longest dimension of the non-circular antenna aperture, and a wide beamwidth axis along the shortest dimension of the noncircular antenna aperture. For example, in the rectangular aperture of the example shown in FIG. 3, the narrow beamwidth axis is along a major axis (the longest line through the center of the array 310) of the aperture, and the wide beamwidth axis is along a minor axis (the shortest line through the center of the array 310) of the aperture.

As used herein, "skew angle" refers to the angle between the narrow beamwidth axis of the beam of the antenna 152, and a line defined by the target satellite 110 and the non-target satellite 120. The half-power beamwidth of the beam of the antenna 152 along the line defined by the target satellite 110 and the non-target satellite 120 is referred to herein as a "composite half-power beamwidth". The composite half-power beamwidth is a mixture of the half-power beamwidths along the narrow beamwidth axis and the wide beamwidth axis respectively, and depends on the skew angle. For example, in embodiments in which the target satellite 110 and the non-target satellite 120 are geostationary satellites along the geostationary arc, the skew angle is the angle between the narrow beamwidth axis and the geostationary arc, and the composite half-power beamwidth is the beamwidth along the geostationary arc.

The skew angle, and thus the composite half-power beamwidth, varies depending upon the geographic location of the aircraft 102. For example, if the antenna system 150 is located at the same longitude as the target satellite 110, the skew angle is zero degrees and the composite half-power beamwidth is the half-power beamwidth along the narrow beamwidth axis. In such a case, the composite half-power beamwidth may be narrow enough that intentional mispointing introduced during the first mispointing correction operation still permits the antenna system 150 to satisfy the interference requirement with the non-target satellite 120. However, if the antenna system 150 is located at a different longitude than the target satellite 110, the skew angle is non-zero and the composite half-power beamwidth is a mixture of the half-power beamwidths along the narrow beamwidth axis and the wide beamdwidth axis. As a result, at certain geographic locations, the composite half-power beamdwidth can be wide enough to cause excessive interference with the non-target satellite 120, if the first mispointing correction operation were used. In such a case, the acceptable geographic region for performing the first mispointing correction operation can correspond to geographic locations wherein the skew angle that is at or below a skew angle threshold, where a skew angle above the threshold would result in excessive interference with the non-target satellite 120 if the first mispointing correction operation were performed. At skew angles above the skew angle threshold, performing the first mispointing correction operation is precluded. Thus, in the example of FIG. 7, if it is determined in step 410 that the first mispointing operation is precluded due to the skew angle, the second mispointing correction operation of step 714 may be performed. In the example of FIG. 4, if it is determined in step 410 that the first mispointing operation is precluded due to the skew angle, step 412 is skipped.

Figure 8:
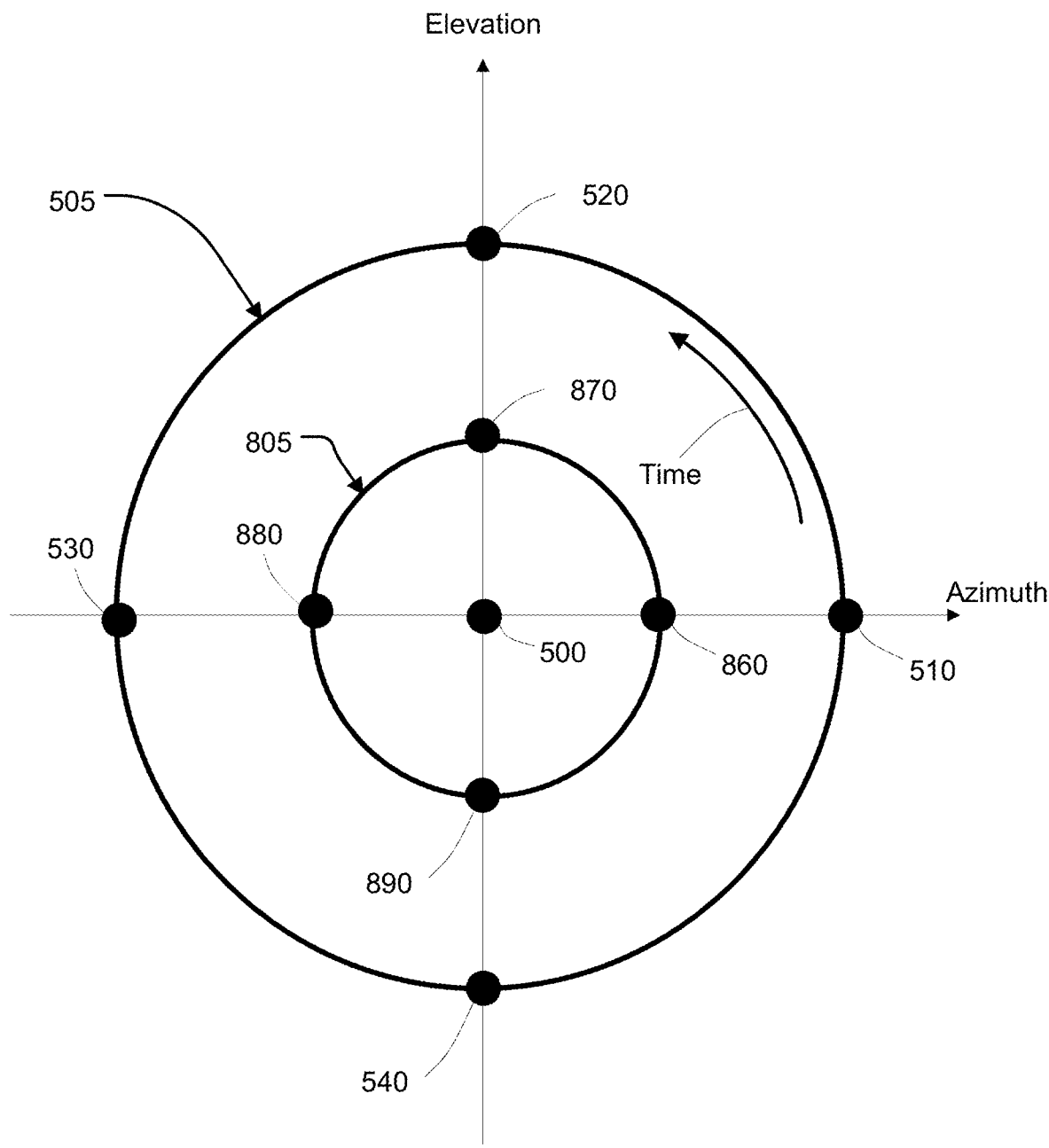
FIG. 8 illustrates example of a correction profile of a second mispointing correction operation as described herein.

FIG. 8 illustrates an example of a correction profile 805 of the second mispointing correction operation as described herein. In the illustrated embodiment, the correction profile 805 is a two axis operation that simultaneously moves in both azimuth and elevation. Also shown in FIG. 8 is the example correction profile 505 of the first mispointing correction operation described in FIG. 5.

Similar to the discussion above with respect to the correction profile 505 of the first mispointing correction operation, during the second mispointing correction operation the antenna control unit 270 controls the positioner 220 to adjust the angular position of the beam of the antenna 152 along the correction profile 805. At the same time, the antenna control unit 270 obtains an indication of signal strength (or other signal metric) of a signal (e.g., forward downlink signal 114) communicated with the target satellite 110 at the various angular positions along the correction profile 805.

In the illustrated embodiment, the angular positions at which measurements are made include a first pair of angular positions 860, 880 along the azimuth axis, and a second pair of angular positions 870, 890 along the elevation axis. In other embodiments, the number of angular positions may be different such as including one or more intermediate angular positions between angular positions 860, 870, 880, 890, and/or may be oriented relative to azimuth axis and elevation axis in a different manner.

The number of cycles the beam is moved around the correction profile 805 can vary from embodiment to embodiment. Upon completing the desired number of cycles of the correction profile 805, the antenna control unit 270 can then estimate the actual direction of the target satellite 110 based on the final signal metric measurements made at the various angular positions along the correction profile 805. In some embodiments, the antenna control unit 270 may also obtain the signal metric when the beam of the antenna 152 was pointed at the initial angular position 500. A least-squares regression analysis or other technique may then be performed by the antenna control unit 270 to form a 3-D curve fitting the measured data. The antenna control unit 270 can then select the final angular position corresponding to the maximum signal metric of the 3-D curve.

The antenna control unit 270 can then provide the control signal to the positioner 220 to adjust the beam of the antenna 152 to point in the selected angular position. The antenna control unit 270 can then return to normal operations, and provide further adjustments to the angular position of the beam as the aircraft 102 moves around relative to the target satellite 110.

In the illustrated embodiment, the range of angular positions of the correction profile 805 is reduced by the same amount in both the azimuth axis and the elevation axis compared to that of the correction profile 505. In other words, the amount of reduction of the angular values of the correction profile 805 is independent of the particular azimuth and elevation angles. In other embodiments, the range of angular positions of the correction profile 805 is not reduced by the same amount in both the azimuth axis and the elevation axis compared to that of the correction profile 505.

In some embodiments the reduction in the range of angular positions of the correction profile 805 compared to the correction profile 505 takes into account the angular position of the non-target satellite 110. As the aircraft 102 moves around to various geographic locations, the angular position of the non-target satellite 120, as viewed in the azimuth/elevation coordinate system of the antenna system 150, will change. For example, in embodiments in which the target satellite 110 and the non-target satellite 120 are geosynchronous satellites, at higher latitudes around the same longitude of the target satellite 110, the non-target satellite 120 is mostly or entirely along the azimuth axis of the antenna system 150. However, at lower latitudes near the equator and at different longitudes of the target satellite 110, the non-target satellite 120 is mostly or entirely along the elevation axis of the antenna system 150.

Thus, in some embodiments the angular positions of the correction profile 805 compared to the correction profile 505 may be selectively reduced in the direction of the non-target satellite 120 sufficient to satisfy the interference requirement. In such a case, at angular positions where moving along the correction profile 505 does not exceed the interference requirement, the angular values of those angular positions of the correction profile 805 may be the same as that of the correction profile 505.

In embodiments in which the antenna 152 has an asymmetric beam, the reduction in the angular positions of the correction profile 805 compared to the correction profile 505 may take into account the skew angle. As mentioned above, the skew angle and thus the composite half-power beamwidth of the beam of the antenna 152 along the line between the target satellite 110 and the non-target satellite 120, varies depending on the geographic location of the aircraft 102. Thus, in some embodiments the angular positions of the correction profile 805 compared the correction profile 505 may be reduced in the direction of the non-target satellite 120 by an amount that is based on the skew angle sufficient to satisfy the interference requirement. For example, if the antenna system 150 is at a first geographic location such that the skew angle is a first value above the skew angle threshold, the angular values of some or all of the angular positions in the direction of the non-target satellite 110 may be reduced by a first amount in order to satisfy the interference requirement. If the antenna system 150 is at a second geographic location such that the skew angle is a second value greater than the first value, the composite half-power beamwidth of the beam of the antenna 152 is greater than when at the first geographic location. Accordingly, when the aircraft 102 is at the second geographic location, the angular values of some or all of the angular positions may be reduced by a second amount that is greater than the first amount in order to satisfy the interference requirement. In some embodiments, the amount of reduction for a given skew angle is independent of the particular azimuth and elevation angles. In other embodiments, the reduction is only in the direction of the non-target satellite 110.

The appropriate angular positions of the correction profile 805 for the various geographic locations of the aircraft 102 can be pre-computed and stored in the look-up table by the antenna control unit 270. The antenna control unit 270 can then use the current geographic location of the aircraft 102 to retrieve the appropriate angular positions of the correction profile 805 from the look-up table. Alternatively, other techniques may be used to obtain the appropriate angular positions.

As a result of the reduced angular range, the amount of intentional mispointing during the second mispointing correction operation is less than that of the first mispointing correction operation. This in turn results in a lower amount of interference with the non-target satellite 120 than the first mispointing correction operation.

At some or all of the geographic locations within the acceptable geographic region of the first mispointing correction operation, the first mispointing correction operation may provide more accurate pointing (i.e., less residual pointing error) at the target satellite than the second mispointing correction operation. For example, moving further away from the initial angular direction 500 may provide a more accurate estimate of the actual direction of the target satellite 110 when subsequently curve-fitting to the measured signal metrics. This is because the difference between measured signal metrics increases with increasing movement away from initial angular direction 500. This in turn makes the estimate of the actual direction of the target satellite 110 less susceptible to non-positional signal fluctuations or noise, and thus results in a more accurate estimate of the actual direction. In some embodiments, at some or all of the angular positions of the correction profile 805 having reduced angle values compared to that of the correction profile 505, the duration of the measurement may be increased in order to lessen the pointing error impact due to not moving as far away from the initial angular direction.

Thus, the first mispointing correction operation may be preferred over the second mispointing correction operation, if either one can be used while satisfying the interference requirement with the non-target satellite 120. However, by performing the second mispointing correction operation, the pointing error can be reduced in geographic locations where use of the first mispointing correction operation is precluded. This in turn can improve the pointing accuracy and thus resource efficiency of satellite communication system 100, as compared to not performing any mispointing correction operation at those locations.

Figure 9:
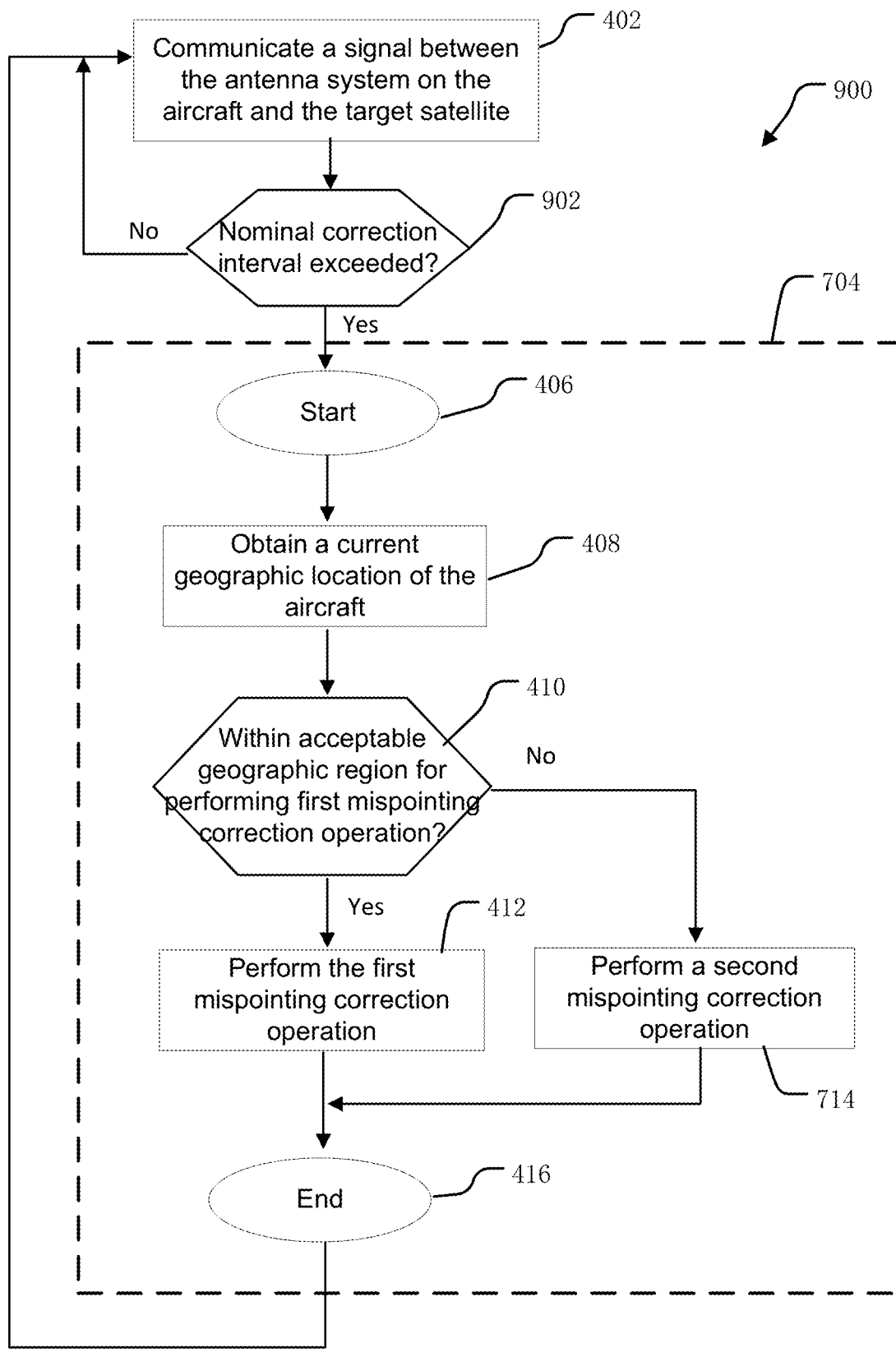
FIG. 9 illustrates an example process for operating the antenna system including performing the example re-pointing process of FIG. 7.

FIG. 9 illustrates an example process 900 for operating the antenna system 150 including performing the example re-pointing process 704 of FIG. 7. Other embodiments can combine some of the steps, can perform the steps in different orders and/or perform different or additional steps to the ones illustrated in FIG. 9. As compared to the process 700 of FIG. 7, the process 900 of FIG. 9 includes step 902. The other steps of FIG. 9 can be the same as the steps described above with respect to FIG. 7, and thus a description of those steps is not repeated here.

As shown in FIG. 9, the re-pointing process 704 is initiated if the nominal correction interval is exceeded. The nominal correction interval is a predetermined time interval (e.g., 15 minutes) between which the re-pointing process 404 should be performed. If at step 902 it is determined that the amount of time since previously performing the re-pointing process 404 exceeds the predetermined time interval, the re-pointing process 704 is initiated.

The predetermined time interval can vary from embodiment to embodiment. The predetermined time interval may for example correspond to the amount of time it is expected to take for the pointing error to increase to a certain pointing error limit. The predetermined time interval may for example be determined empirically (e.g., by comparing correction offsets and estimating the typical rate the offset difference increases with time), or calculated (e.g., by using a heading drift value from a datasheet of the IRU 280).

Figure 10:
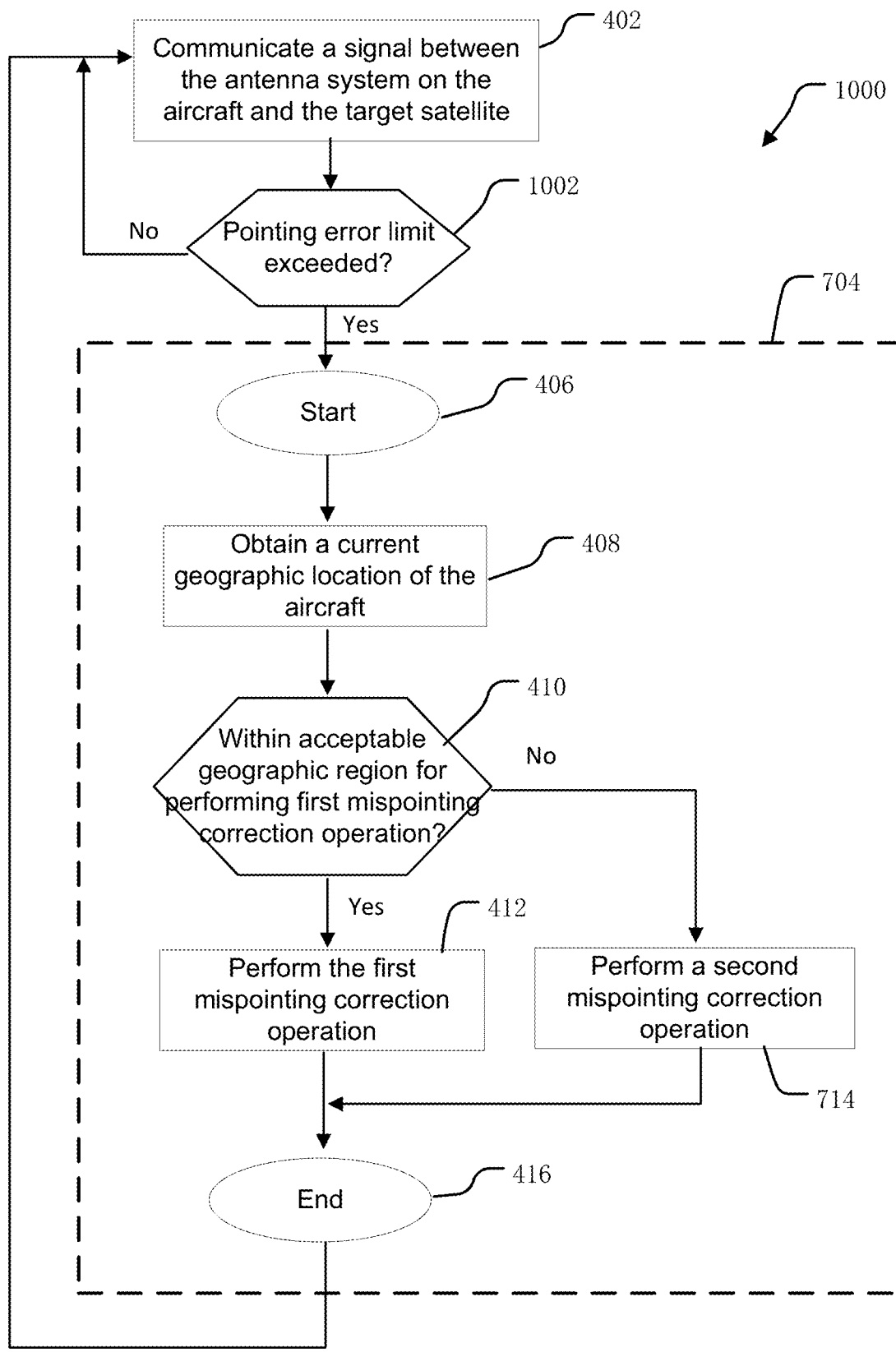
FIG. 10 illustrates another example process for operating the antenna system including performing the example re-pointing process of FIG. 7.

FIG. 10 illustrates an example process 1000 for operating the antenna system 150 including performing the example re-pointing process 704 of FIG. 7. Other embodiments can combine some of the steps, can perform the steps in different orders and/or perform different or additional steps to the ones illustrated in FIG. 10. As compared to the process 700 of FIG. 7, the process 1000 of FIG. 10 includes step 1002. The other steps of FIG. 10 can be the same as the steps described above with respect to FIG. 7, and thus a description of those steps is not repeated here.

As shown in FIG. 10, the repointing process 704 is initiated if the predicted pointing error exceeds a pointing error limit. If at step 1002 it is determined that predicted pointing error exceeds the pointing error limit, the re-pointing process 704 is initiated. The predicted pointing error may be calculated using various techniques that can take into consideration one or more of the factors that can cause the pointing error to increase with time, such as drift of a navigation sensor (e.g., an inertial reference unit (IRU) 280) on the aircraft 102, structural deflections of the aircraft 102 caused by takeoff, movement and other disturbances, etc.

In some embodiments, the predicted pointing error takes into consideration the drift characteristics of the IRU 280. The antenna control unit 270 may for example integrate the worst-case drift rate of the IRU 280 over time to determine its pointing error contribution. The worst-case drift rate may for example be determined empirically and the results stored in the look-up table. In some embodiments, the IRU 280 may operate in a GPS augmentation mode when the aircraft 102 is in motion and valid geographic location data is available from the GPS 274, and operate in a free inertial mode when either of these conditions are not met. In such a case, the worst-case drift rate used by the antenna control unit 270 may depend on the current operational mode the IRU 280.

In some embodiments, the predicted pointing error takes into consideration the flight characteristics of the aircraft 102. For example, the estimated pointing error may include a fuselage flexure pointing error if it is determined by the antenna control unit 270 (or other component) that the aircraft 102 has taken off since the last re-pointing process. The fuselage flexure pointing error may be determined empirically and stored in the look-up table. The fuselage flexure pointing error may depend on various factors including the aircraft type, etc. The manner in which it is determined that takeoff of the aircraft 102 has occurred can vary from embodiment to embodiment. For example, the antenna control unit 270 may determine that takeoff has occurred based on changes in the groundspeed and altitude data provided by the IRU 280. Alternatively, other techniques may be used.

Figure 11:
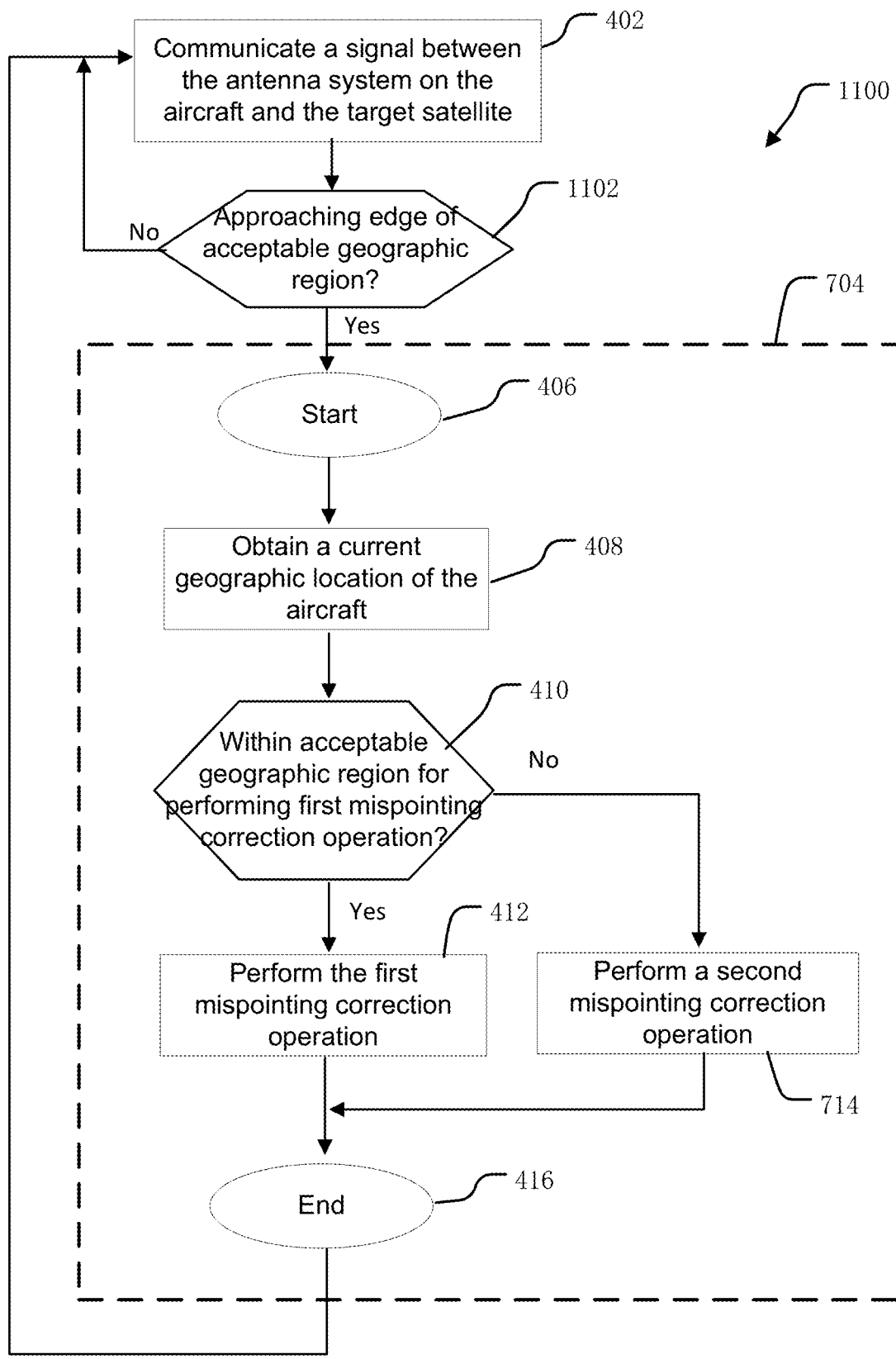
FIG. 11 illustrates another example process for operating the antenna system including performing example re-pointing process of FIG. 7.

FIG. 11 illustrates an example process 1100 for operating the antenna system 150 including performing example re-pointing process 704 of FIG. 7. Other embodiments can combine some of the steps, can perform the steps in different orders and/or perform different or additional steps to the ones illustrated in FIG. 11.

As shown in FIG. 11, the repointing process 704 is initiated if the aircraft 102 is approaching an edge of the acceptable geographic region for performing the first mis-pointing correction operation. If at step 1102 it is determined that the aircraft 102 is within a predetermined distance from an edge, the re-pointing process 704 is initiated. The particular geographic locations that are the predetermined distance from an edge may for example be predetermined and be stored in the look-up table. The antenna control unit 270 can then use the look-up table to determine whether to initiate the repointing process 704 based on the current location of the aircraft 102.

In the example of FIG. 11, the repointing process 704 is initiated at step 1102, and then at step 410 it is determined whether the aircraft 102 is within the acceptable geographic region for performing the first mispointing correction operation. Alternatively, at step 1102 it may be determined whether the aircraft 102 is within the acceptable geographic region for performing the first mispointing correction operation. In such a case, the step 410 and subsequent step 714 may be omitted from the process 1100.

Figure 12:
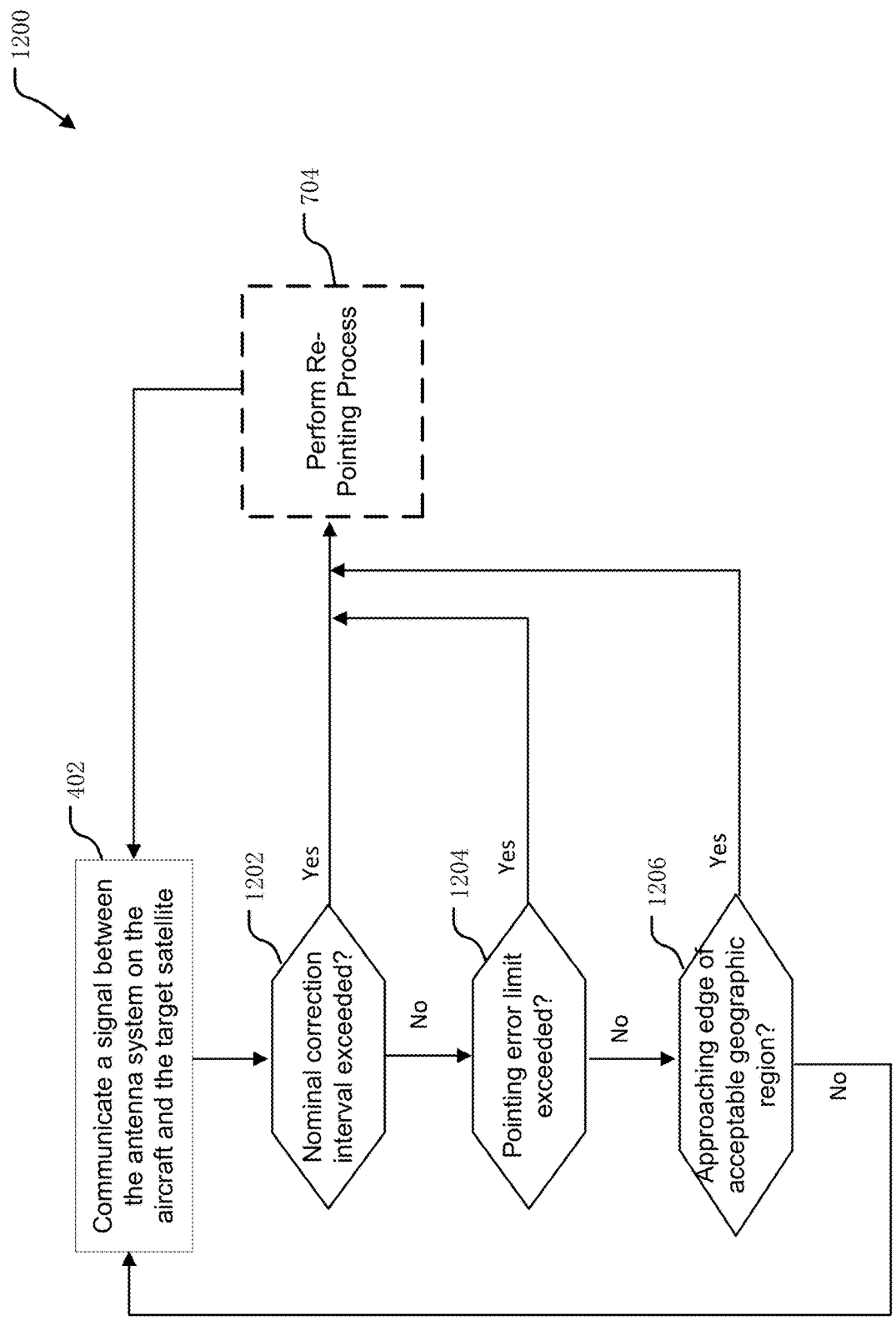
FIG. 12 illustrates another example process for operating the antenna system 150 including performing the example re-pointing process of FIG. 7.

FIG. 12 illustrates an example process 1200 for operating the antenna system 150 including performing the example re-pointing process 704 of FIG. 7. Other embodiments can combine some of the steps, can perform the steps in different orders and/or perform different or additional steps to the ones illustrated in FIG. 12.

Step 402 can be the same as described above with respect to FIGS. 4 and 7, and thus a description of that step is not repeated here.

At step 1202, the antenna control unit 270 determines whether the nominal correction interval is exceeded. Step 1202 may be the same as step 902 discussed above with respect to FIG. 9. If the nominal correction interval is exceeded, the process 1200 initiates the re-pointing process 704 and then returns to step 402. If the nominal correction interval is not exceeded, the process 1200 moves to step 1204.

At step 1204, the antenna control unit 270 determines whether the pointing error limit is exceeded. Step 1204 may be the same as step 1002 of FIG. 10. If the pointing error limit is exceeded, the process 1200 initiates the re-pointing process 704 and then returns to step 402. If the pointing error limit is not exceeded, the process 1200 moves to step 1206.

At step 1206, the antenna control unit 270 determines whether the aircraft 102 is approaching an edge of the acceptable geographic region for performing the first mispointing correction operation. Step 1206 may be the same as step 1102 of FIG. 11. If the aircraft 102 is approaching an edge of the acceptable geographic region, the process 1200 initiates the re-pointing process 704 and then returns to step 402. If the aircraft 102 is not approaching an edge of the acceptable geographic region, the process returns to step 402.

The methods disclosed herein include one or more actions for achieving the described method. The methods and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

While the present disclosure is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method comprising:
communicating a signal between an antenna system on a mobile vehicle and a target satellite;
determining that an expected amount of interference by the communicated signal with a non-target satellite due to intentional mispointing of the antenna system for a first mispointing correction operation is below a threshold; and
performing the first mispointing correction operation based at least in part on the determination that the expected amount of interference is below the threshold, wherein performing the first mispointing correction operation comprises:
adjusting a beam of the antenna system from an initial angular position toward the target satellite to a plurality of angular positions and obtaining a signal metric of the communicated signal at the plurality of angular positions, and
positioning the beam of the antenna system relative to the initial angular position based on the obtained signal metric of the communicated signal at the plurality of angular positions.

2. The method of claim 1, wherein determining that the expected amount of interference by the communicated signal with the non-target satellite is below the threshold comprises determining one or more of: an antenna pattern characteristic of the antenna system, a transmit power of a return uplink signal, a frequency range of the return uplink signal, a range of angular positions of the first mispointing correction operation, a location of the mobile vehicle, an attitude of the mobile vehicle, a location of the target satellite, a location of the non-target satellite, an operating frequency, a system gain-to-noise temperature (G/T), and a polarization of an operation of the non-target satellite.

3. The method of claim 1, wherein determining that the expected amount of interference by the communicated signal with the non-target satellite is below the threshold comprises:
determining a location of the mobile vehicle; and
determining a value of a look-up table based at least in part on the location of the mobile vehicle, wherein the look-up table indicates whether or not performing the first mispointing correction operation is permitted at a plurality of locations including the location of the mobile vehicle.

4. The method of claim 1, further comprising:
after performing the first mispointing correction operation, determining that a second expected amount of interference by a second communicated signal with the non-target satellite due to intentional mispointing of the antenna system for a second mispointing correction operation meets or exceeds the threshold; and
performing the second mispointing correction operation based at least in part on the determination that the second expected amount of interference meets or exceeds the threshold, wherein the second mispointing correction operation has one or more parameters different than the first mispointing correction operation to maintain interference with the non-target satellite below the threshold.

5. The method of claim 4, wherein the one or more parameters includes one or more of a transmit power of the communicated signal, a range of angular positions about at least one axis of the antenna system, and a duration of measurement of the communicated signal at an angular position.

6. The method of claim 1, further comprising determining if an amount of time since previously performing the first mispointing correction operation exceeds a predetermined time interval, and wherein the performing the first mispointing correction operation of the antenna system is further based at least in part on a determination that the amount of time exceeds the predetermined time interval.

7. The method of claim 1, further comprising determining if a predicted pointing error of the beam of the antenna system towards the target satellite exceeds a pointing error limit, and wherein the performing the first mispointing correction operation of the antenna system is further based at least in part on a determination that the predicted pointing error exceeds the pointing error limit.

8. The method of claim 1, further comprising determining if the mobile vehicle is within a predetermined distance from an edge of an acceptable geographic region in which the expected amount of interference with the non-target satellite by the communicated signal during the first mispointing correction operation is below the threshold, and wherein the performing the first mispointing correction operation of the antenna system is further based at least in part on a determination that the mobile vehicle is within the predetermined distance.

9. The method of claim 8, wherein:
the communicated signal is an uplink signal transmitted from the antenna system to the target satellite; and
performing the first mispointing correction operation uses a downlink signal received by the antenna system from the target satellite.

10. The method of claim 9, wherein:
the target satellite comprises a plurality of spot beams;
the antenna system adjusts a power level of the uplink signal based on a position of the mobile vehicle within coverage areas of the plurality of spot beams; and
the acceptable geographic region for performing the first mispointing correction operation corresponds to centers of the coverage areas of the plurality of spot beams.

11. The method of claim 1, further comprising:
after performing the first mispointing correction operation, determining that a second expected amount of interference by a second communicated signal with the non-target satellite due to intentional mispointing of the antenna system for the first mispointing correction operation meets or exceeds the threshold, wherein the second communicated signal is an uplink signal transmitted from the antenna system to the target satellite;
muting transmission of the uplink signal; and
performing the first mispointing correction operation.

12. The method of claim 1, wherein the mobile vehicle is one of an aircraft, a boat or a train.

13. An antenna system for mounting on a mobile vehicle, the antenna system comprising:
- an antenna having a beam for communicating a signal with a target satellite;
- a pointing adjustment mechanism coupled to the antenna and responsive to control signals to adjust an angular position of the beam of the antenna; and
- an antenna control unit to:
  - determine that an expected amount of interference by the communicated signal with a non-target satellite due to intentional mispointing of the antenna system for a first mispointing correction operation is below a threshold; and
  - provide a control signal to the pointing adjustment mechanism to perform the first mispointing correction operation based at least in part on the determination that the expected amount of interference is below the threshold, wherein performing the first mispointing correction operation comprises:
    - adjusting the beam of the antenna system from an initial angular position toward the target satellite to a plurality of angular positions and obtaining a signal metric of the communicated signal at the plurality of angular positions, and
    - positioning the beam of the antenna system relative to the initial angular position based on the obtained signal metric of the communicated signal at the plurality of angular positions.

14. The antenna system of claim 13, wherein the antenna control unit is configured to determine that the expected amount of interference by the communicated signal with the non-target satellite is below the threshold by determining one or more of: an antenna pattern characteristic of the antenna system, a transmit power of a return uplink signal, a frequency range of the return uplink signal, a range of angular positions of the first mispointing correction operation, a location of the mobile vehicle, an attitude of the mobile vehicle, a location of the target satellite, a location of the non-target satellite, an operating frequency, a system gain-to-noise temperature (G/T), and a polarization of an operation of the non-target satellite.

15. The antenna system of claim 13, wherein the antenna control unit is configured to determine that the expected amount of interference by the communicated signal with the non-target satellite is below the threshold by:
- determining a location of the mobile vehicle; and
- determining a value of a look-up table based at least in part on the location of the mobile vehicle, wherein the look-up table indicates whether or not performing the first mispointing correction operation is permitted at a plurality of locations including the location of the mobile vehicle.

16. The antenna system of claim 13, wherein the antenna control unit is further to:
- after the pointing adjustment mechanism performs the first mispointing correction operation, determine that a second expected amount of interference by a second communicated signal with the non-target satellite due to intentional mispointing of the antenna system for a second mispointing correction operation meets or exceeds the threshold; and
- provide a second control signal to the pointing adjustment mechanism to perform the second mispointing correction operation based at least in part on the determination that the second expected amount of interference meets or exceeds the threshold, wherein the second mispointing correction operation has one or more parameters different than the first mispointing correction operation to maintain interference with the non-target satellite below the threshold.

17. The antenna system of claim 16, wherein the one or more parameters includes one or more of a transmit power of the communicated signal, a range of angular positions about at least one axis of the antenna system, and a duration of measurement of the communicated signal at an angular position.

18. The antenna system of claim 13, wherein the antenna control unit is further to determine if an amount of time since previously performing the first mispointing correction operation exceeds a predetermined time interval, and wherein the antenna control unit is further to provide the control signal to the pointing adjustment mechanism to perform the first mispointing correction operation of the antenna system based at least in part on a determination that the amount of time exceeds the predetermined time interval.

19. The antenna system of claim 13, wherein the antenna control unit is further to determine if a predicted pointing error of the beam of the antenna system towards the target satellite exceeds a pointing error limit, and wherein the antenna control unit is further to provide the control signal to the pointing adjustment mechanism to perform the first mispointing correction operation of the antenna system based at least in part on a determination that the predicted pointing error exceeds the pointing error limit.

20. The antenna system of claim 13, wherein the antenna control unit is further to determine if the mobile vehicle is within a predetermined distance from an edge of an acceptable geographic region in which the expected amount of interference with the non-target satellite by the communicated signal during the first mispointing correction operation is below the threshold, and wherein the antenna control unit is further to provide the control signal to the pointing adjustment mechanism to perform the first mispointing correction operation of the antenna system the antenna system based at least in part on a determination that the mobile vehicle is within the predetermined distance.

21. The antenna system of claim 20, wherein:
- the communicated signal is an uplink signal transmitted from the antenna system to the target satellite; and
- the pointing adjustment mechanism performs the first mispointing correction operation using a downlink signal received by the antenna system from the target satellite.

22. The antenna system of claim 21, wherein:
- the target satellite comprises a plurality of spot beams;
- the antenna system adjusts a power level of the uplink signal based on a position of the mobile vehicle within coverage areas of the plurality of spot beams; and
- the acceptable geographic region for performing the first mispointing correction operation corresponds to centers of the coverage areas of the plurality of spot beams.

23. The antenna system of claim 13, wherein the antenna control unit is further to:
- after the pointing adjustment mechanism performs the first mispointing correction operation, determine that a second expected amount of interference by a second communicated signal with the non-target satellite due to intentional mispointing of the antenna system for the first mispointing correction operation meets or exceeds the threshold, wherein the second communicated signal is an uplink signal transmitted from the antenna system to the target satellite;

mute transmission of the uplink signal; and
provide a second control signal to the pointing adjustment mechanism to perform the first mispointing correction operation.

24. The antenna system of claim 13, wherein the mobile vehicle is one of an aircraft, a boat or a train.

* * * * *